United States Patent
Lee et al.

(10) Patent No.: US 9,743,102 B2
(45) Date of Patent: Aug. 22, 2017

(54) METHOD AND APPARATUS FOR ENCODING/DECODING IMAGES USING A MOTION VECTOR OF A PREVIOUS BLOCK AS A MOTION VECTOR FOR THE CURRENT BLOCK

(71) Applicant: SAMSUNG ELECTRONICS CO., LTD., Suwon-si (KR)

(72) Inventors: Tammy Lee, Seoul (KR); Woo-jin Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/293,375

(22) Filed: Oct. 14, 2016

(65) Prior Publication Data

US 2017/0034527 A1 Feb. 2, 2017

Related U.S. Application Data

(63) Continuation of application No. 15/133,918, filed on Apr. 20, 2016, now Pat. No. 9,491,484, which is a
(Continued)

(30) Foreign Application Priority Data

Jan. 19, 2011 (KR) .................. 10-2011-0005377

(51) Int. Cl.
*H04N 19/513* (2014.01)
*H04N 19/56* (2014.01)
(Continued)

(52) U.S. Cl.
CPC ......... *H04N 19/513* (2014.11); *H04N 19/124* (2014.11); *H04N 19/159* (2014.11);
(Continued)

(58) Field of Classification Search
CPC .................................................... H04N 19/513
(Continued)

(56) References Cited

U.S. PATENT DOCUMENTS

| 8,275,039 B2 | 9/2012 | Han et al. |
| 8,792,558 B2 | 7/2014 | Lee et al. |

(Continued)

FOREIGN PATENT DOCUMENTS

| EP | 1513349 A2 | 3/2005 |
| EP | 2094017 A2 | 8/2009 |

(Continued)

OTHER PUBLICATIONS

Thomas Wiegand et al., "WD1: Working Draft 1 of High-Efficiency Video Coding", Joint Collaborative Team on Video Coding (JCT-VC) of ITU-T SG16 WP3 and ISO/IEC JTC1/SC29/WG11, Document: JCTVC-C403, 3rd Meeting: Guangzhou, CN, Oct. 7-15, 2010, total 20 pages.

(Continued)

*Primary Examiner* — Yulin Sun
(74) *Attorney, Agent, or Firm* — Sughrue Mion, PLLC

(57) ABSTRACT

An encoding method and apparatus and a decoding method and apparatus for determining a motion vector of a current block based on a motion vector of at least one previously-encoded or previously-decoded block are provided. The decoding method includes: decoding information regarding a prediction direction from among a first direction, a second direction, and bi-directions, and information regarding pixel values of the current block; determining the prediction direction in which the current block is to be predicted, based on the decoded information regarding the prediction direction, and determining a motion vector for predicting the current block in the determined prediction direction; and restoring the current block, based on the determined motion
(Continued)

vector and the decoded information regarding the pixel values, wherein the first direction is a direction from a current picture to a previous picture, and the second direction is a direction from the current picture to a subsequent picture.

1 Claim, 14 Drawing Sheets

Related U.S. Application Data continuation of application No. 13/574,110, filed as application No. PCT/KR2011/000387 on Jan. 19, 2011, now Pat. No. 9,351,017.

(60) Provisional application No. 61/296,141, filed on Jan. 19, 2010.

(51) Int. Cl.
| | |
|---|---|
| *H04N 19/70* | (2014.01) |
| *H04N 19/51* | (2014.01) |
| *H04N 19/96* | (2014.01) |
| *H04N 19/176* | (2014.01) |
| *H04N 19/577* | (2014.01) |
| *H04N 19/124* | (2014.01) |
| *H04N 19/159* | (2014.01) |
| *H04N 19/61* | (2014.01) |
| *H04N 19/172* | (2014.01) |
| *H04N 19/182* | (2014.01) |

(52) U.S. Cl.
CPC ........... *H04N 19/176* (2014.11); *H04N 19/51* (2014.11); *H04N 19/56* (2014.11); *H04N 19/577* (2014.11); *H04N 19/61* (2014.11); *H04N 19/70* (2014.11); *H04N 19/96* (2014.11); *H04N 19/172* (2014.11); *H04N 19/182* (2014.11)

(58) Field of Classification Search
USPC .................................................. 375/240.15
See application file for complete search history.

(56) References Cited

U.S. PATENT DOCUMENTS

| | | | |
|---|---|---|---|
| 8,804,828 | B2 | 8/2014 | Choi et al. |
| 8,831,105 | B2 | 9/2014 | Lee et al. |
| 8,855,202 | B2 | 10/2014 | Regunathan et al. |
| 9,578,323 | B2 | 2/2017 | Kondo et al. |
| 2003/0091113 | A1* | 5/2003 | Matsuura ............... H04N 5/145 375/240.16 |
| 2004/0190615 | A1 | 9/2004 | Abe et al. |
| 2004/0190616 | A1* | 9/2004 | Linzer .................... H04N 19/57 375/240.16 |
| 2005/0053292 | A1 | 3/2005 | Mukerjee et al. |
| 2006/0029137 | A1 | 2/2006 | Lee et al. |
| 2006/0125956 | A1 | 6/2006 | Lee |
| 2007/0019730 | A1* | 1/2007 | Lee ........................ H04N 19/52 375/240.15 |
| 2009/0232217 | A1 | 9/2009 | Lee et al. |
| 2009/0290643 | A1 | 11/2009 | Yang |
| 2010/0128792 | A1 | 5/2010 | Saito et al. |
| 2015/0326879 | A1 | 11/2015 | Alshina et al. |

FOREIGN PATENT DOCUMENTS

| | | |
|---|---|---|
| JP | 2004-208258 A | 7/2004 |
| JP | 2007-532036 A | 11/2007 |
| JP | 2009-201112 A | 9/2009 |
| KR | 10-2008-0064072 A | 7/2008 |
| KR | 10-2011-0017301 A | 2/2011 |
| KR | 10-2013-0092526 A | 8/2013 |
| WO | 2010002214 A2 | 1/2010 |
| WO | 2010002214 A3 | 1/2010 |

OTHER PUBLICATIONS

Communication dated Dec. 20, 2016, issued by the Japanese Patent Office in counterpart Japanese application No. 2016-111255.
Communication dated Feb. 2, 2016 issued by the Japanese Patent Office in counterpart Japanese Patent Application No. 2012-549942.
Ken McCann et al; "Samsung's Response to the Call for Proposals on Video Compression Technology"; Joint collaborative team on video coding (JCT-VC) of ITU-T SG16 WP3 and ISO/IEC JTC1/SC29/WG11; Document: JCTVC-A124; Apr. 2010; pp. 1-12; 13 pgs. total.
Communication dated Jul. 7, 2015, issued from the European Patent Office in counterpart European Patent Application No. 11734862.3.
Communication dated Sep. 3, 2015, issued by the Korean Intellectual Property Office in counterpart Korean Application Patent No. 10-2011-005377.
Guillaume Laroche et al: "RD Optimized Coding for Motion Vector Predictor Selection", IEEE Transactions on Circuits and Systems for Video Technology, IEEE Service Center, Piscataway, NJ, US, vol. 18, No. 12, Dec. 1, 2008, pp. 1681-1691, XP011234848.
Jeon: "Direct mode in B pictures", 4th. JVT Meeting; 61. MPEG Meeting; Jul. 22-26, 2002; Klagenfurt, AT; (Joint Video Team of ISO/IEC JCT1/SC29/WG11 and ITU-T SG. 16 Q. 6), No. JVT-D056, Jul. 26, 2002, pp. 1-10, XP030005330.
Yamamoto T et al: "Alternative colPic for temporal direct prediction", 29th. VCEG Meeting; 75 MPEG Meeting; Jan. 16, 2006; Bangkok, TH; (Video Encoding Experts Group of ITU-T SG. 16), No. VCEG-AB07, Jan. 16-17, 2006 (Jan. 15, 2006), 5 pages, XP030003481.
Communication dated Mar. 17, 2015 issued by the Japanese Patent Office in counterpart Japanese Patent Application No. 2012-549942.
Jaeil Kim, et al.; "Enlarging MB size for high fidelity video coding beyond HD"; ITU-Telecommunications Standardization Sector Study Group 16 Question 6 VCEG-AJ21; Oct. 2008; pp. 1-6.
Communication from the State Intellectual Property Office of P.R. China dated Oct. 14, 2014, in a counterpart application No. 201180014824.9.
Communication from the Japanese Patent Office dated Oct. 28, 2014, in a counterpart Japanese application No. 2012-549942.
International Search Report (PCT/ISA/210), dated Sep. 20, 2011, issued by the International Searching Authority in corresponding International Application No. PCT/KR2011/000387.
Written Opinion (PCT/ISA/237) of the International Searching Authority, issued on Sep. 20, 2011 in corresponding International Application No. PCT/KR2011/000387.
Guillaume L. et al., "RD optimized coding for motion vector predictor selection", IEEE Trans. on CSVT, vol. 18, No. 9, Sep. 2008.
Communication dated Sep. 30, 2016, issued by the Korean Patent Office in counterpart Korean Patent Application No. 10-2016-0034725.

* cited by examiner

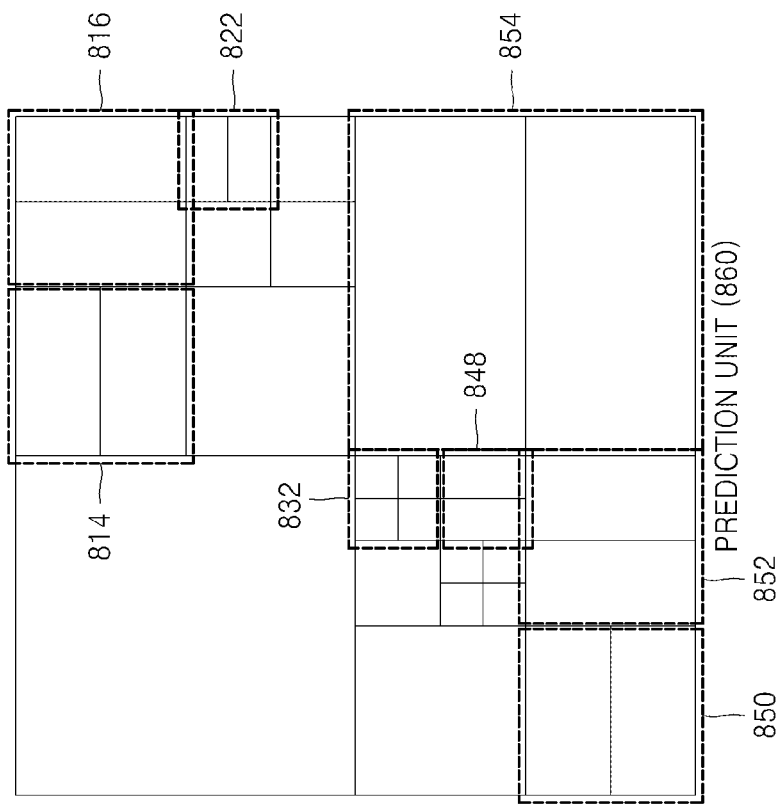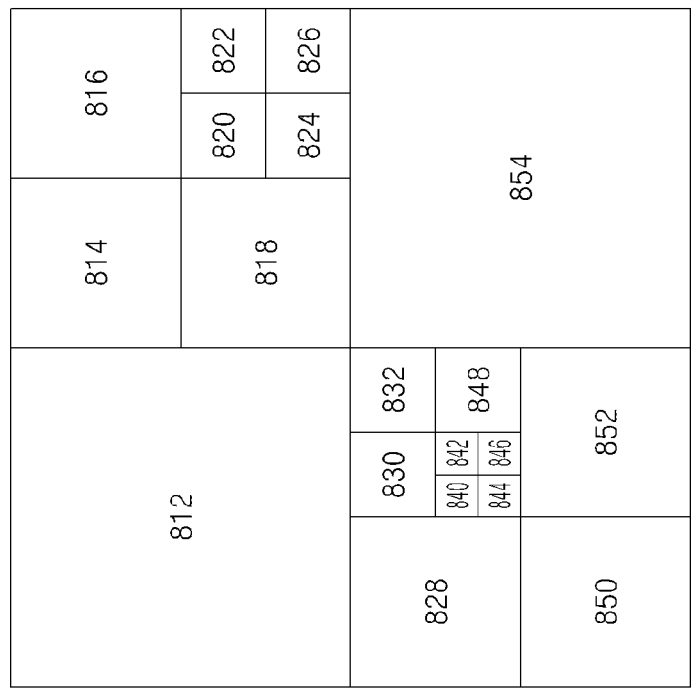
FIG. 8A

METHOD AND APPARATUS FOR ENCODING/DECODING IMAGES USING A MOTION VECTOR OF A PREVIOUS BLOCK AS A MOTION VECTOR FOR THE CURRENT BLOCK

CROSS-REFERENCE TO RELATED PATENT APPLICATIONS

This application is a continuation application of U.S. patent application Ser. No. 15/133,918, filed on Apr. 20, 2016, which is a continuation application of U.S. patent application Ser. No. 13/574,110, filed on Jul. 19, 2012, which is a National Stage application under 35 U.S.C. §371 of PCT/KR2011/000387 filed on Jan. 19, 2011, which claims priority from U.S. Provisional Patent Application No. 61/296,141, filed on Jan. 19, 2010 in the U.S. Patent and Trademark Office, and Korean Patent Application No. 10-2011-0005377, filed on Jan. 19, 2011 in the Korean Intellectual Property Office, all the disclosures of which are incorporated herein in their entireties by reference.

BACKGROUND

1. Field

Apparatuses and methods consistent with exemplary embodiments relate to encoding and decoding an image, and more particularly, to encoding and decoding an image based on inter prediction.

2. Description of the Related Art

According to video compression standards, such as MPEG-1, MPEG-2, and MPEG-4 H.264/MPEG-4 AVC (Advanced Video coding), an image is encoded by dividing the image into predetermined sized blocks. Next, each of the predetermined sized blocks is prediction-encoded by using inter prediction or intra prediction.

For inter prediction, motion estimation is performed by searching at least one reference frame for a block that is the same as or similar to a current block, a motion vector produced by performing the motion estimation is encoded together with pixel values, and a result of encoding is then inserted into a bitstream.

SUMMARY

Aspects of one or more exemplary embodiments provide an image encoding method and apparatus and an image decoding method and apparatus, in which a motion vector of a current block is determined based on a motion vector of at least one previous block and an image is encoded/decoded based on the determined motion vector, and a computer readable recording medium having recorded thereon a program for executing the image encoding method and/or the image decoding method.

According to aspects of an exemplary embodiment, encoding is performed using a motion vector of at least one previous block as a motion vector of a current block, thereby increasing a hit ratio of an encoding mode and the precision of prediction. Accordingly, it is possible to encode and decode an image with a higher compression ratio.

According to an aspect of an exemplary embodiment, there is provided an image decoding method of determining a motion vector of a current block based on a motion vector of at least one block decoded before decoding of the current block, and decoding the current block based on the determined motion vector, the method including: decoding information regarding a prediction direction to be used to decode the current block from among a first direction, a second direction, and bi-directions, and information regarding pixel values of the current block; determining a prediction direction in which the current block is to be predicted, based on a result of decoding the information regarding the prediction direction, and determining at least one motion vector for predicting the current block in the determined prediction direction; and restoring the current block, based on the at least one motion vector and a result of decoding the information regarding the pixel values, wherein the first direction is a direction from a current picture to a previous picture, and the second direction is a direction from the current picture to a subsequent picture.

According to an aspect of another exemplary embodiment, there is provided an image encoding method of determining a motion vector of a current block based on a motion vector of at least one block encoded before encoding of the current block, and encoding the current block based on the determined motion vector, the method including: determining a first-direction motion vector and a second-direction motion vector of the current block based on the motion vector of the at least one block; determining a prediction method to be used to encode the current block from among first-direction prediction, second-direction prediction, and bi-directional prediction, based on the first-direction motion vector and the second-direction motion vector; and encoding information regarding a prediction direction used in the determined prediction method, and information regarding pixel values of the current block produced based on the prediction method, wherein the first direction is a direction from a current picture to a previous picture, and the second direction is a direction from the current picture to a subsequent picture.

According to an aspect of another exemplary embodiment, there is provided an image decoding apparatus for determining a motion vector of a current block based on a motion vector of at least one block decoded before decoding of the current block, and decoding the current block based on the determined motion vector, the apparatus including: a decoder for decoding information regarding a prediction direction to be used to decode the current block from among a first direction, a second direction, and bi-directions, and information regarding pixel values of the current block; a motion vector determiner for determining a prediction direction in which the current block is to be predicted, based on a result of decoding the information regarding the prediction direction, and determining at least one motion vector for predicting the current block in the determined prediction direction; and a restoring unit for restoring the current block, based on the at least one motion vector and a result of decoding the information regarding the pixel values, wherein the first direction is a direction from a current picture to a previous picture, and the second direction is a direction from the current picture to a subsequent picture.

According to an aspect of another exemplary embodiment, there is provided an image encoding apparatus for determining a motion vector of a current block based on a motion vector of at least one block encoded before encoding of the current block, and encoding the current block based on the determined motion vector, the apparatus including: a motion vector determiner for determining a first-direction motion vector and a second-direction motion vector of the current block based on the motion vector of the at least one block; an encoder for determining a prediction method to be used to encode the current block from among first-direction prediction, second-direction prediction, and bi-directional prediction, based on the first-direction motion vector and the second-direction motion vector, and encoding information regarding a prediction direction used in the determined prediction method and information regarding pixel values of the current block produced based on the prediction method, wherein the first direction is a direction from a current picture to a previous picture, and the second direction is a direction from the current picture to a subsequent picture.

According to an aspect of another exemplary embodiment, there is provided a computer readable recording medium having recorded thereon a program for executing the image encoding method or the image decoding method.

BRIEF DESCRIPTION OF THE DRAWINGS

FIGS. 8A and 8B illustrate division shapes of a coding unit, a prediction unit, and a transform unit, according to an exemplary embodiment;

DETAILED DESCRIPTION OF EXEMPLARY EMBODIMENTS

Hereinafter, exemplary embodiments will be described in greater detail with reference to the accompanying drawings.

Figure 1:
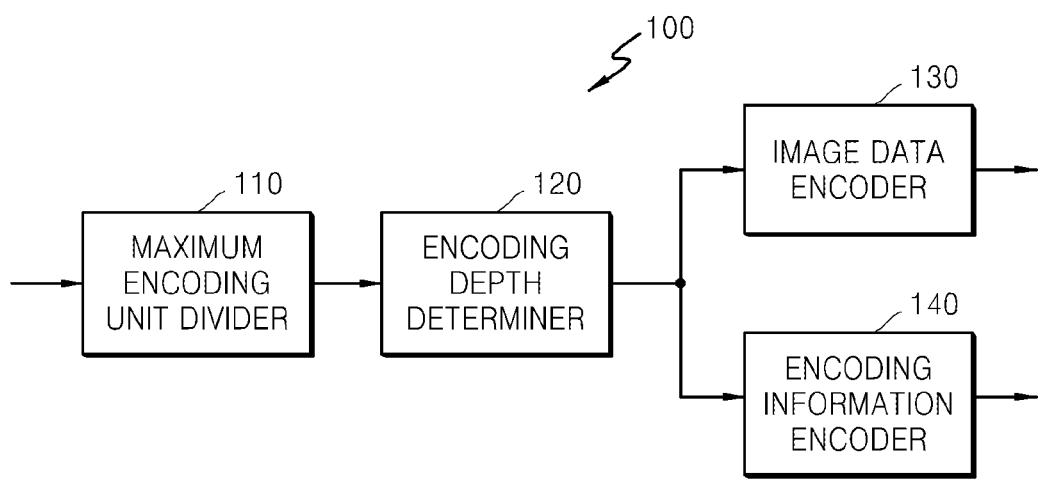
FIG. 1 is a block diagram of an image encoding apparatus according to an exemplary embodiment.

FIG. 1 is a block diagram of an image encoding apparatus 100 according to an exemplary embodiment.

Referring to FIG. 1, the image encoding apparatus 100 includes a maximum coding unit divider 110, an encoding depth determiner 120, an image data encoder 130, and an encoding information encoder 140.

The maximum coding unit divider 110 may divide a current frame or slice based on a maximum coding unit that is a coding unit having the largest size from among coding units of the current frame or slice. That is, the maximum coding unit divider 110 may divide the current frame or slice into at least one maximum coding unit.

According to an exemplary embodiment, a coding unit may be represented using a maximum coding unit and a depth. As described above, the maximum coding unit indicates a coding unit having the largest size from among coding units of the current frame, and the depth indicates a degree of hierarchically decreasing of the coding unit. As a depth increases, a coding unit may decrease from a maximum coding unit to a minimum coding unit, wherein a depth of the maximum coding unit is defined as a minimum depth and a depth of the minimum coding unit is defined as a maximum depth. Since the size of a coding unit decreases from a maximum coding unit as a depth increases, a sub coding unit of a kth depth may include a plurality of sub coding units of a (k+n)th depth (k and n are integers equal to or greater than 1).

According to an increase of the size of a frame to be encoded, encoding an image in a greater coding unit may lead to a higher image compression ratio. However, if a greater coding unit is fixed, an image may not be efficiently encoded by reflecting continuously changing image characteristics.

For example, when a smooth area such as the sea or sky is encoded, the greater a coding unit is, the more a compression ratio may increase. However, when a complex area such as people or buildings is encoded, the smaller a coding unit is, the more a compression ratio may increase.

Accordingly, according to an exemplary embodiment, a maximum image coding unit and a maximum depth are independently set for each frame or slice. Since a maximum depth denotes the maximum number of times by which a coding unit may decrease, the size of each minimum coding unit included in a maximum image coding unit may be variably set according to a maximum depth.

The encoding depth determiner 120 determines a maximum depth. The maximum depth may be determined based on calculation of rate-distortion (RD) costs. The maximum depth may be determined differently for each frame or slice or for each maximum coding unit. The determined maximum depth is provided to the encoding information encoder 140, and image data according to maximum coding units is provided to the image data encoder 130.

A maximum depth denotes a coding unit having a smallest size, i.e., a minimum coding unit, which may be included in a maximum coding unit. In other words, a maximum coding unit may be divided into sub coding units having different sizes according to different depths (see FIGS. 8A and 8B for details). Sub coding units having different sizes, which are included in the maximum coding unit, may be predicted or transformed based on processing units having different sizes. The transform may be discrete cosine transformation (DCT) or Karhunen Loever Transform (KLT), in which pixel values in a spatial domain are transformed into frequency-domain coefficients.

In other words, the image encoding apparatus 100 may perform a plurality of processing operations for image encoding, based on processing units having various sizes and various shapes. To encode image data, processing operations, such as prediction, transform, and entropy encoding, are performed, wherein processing units having the same size or different sizes may be used for every operation.

For example, the image encoding apparatus 100 may select a processing unit that is different from a coding unit to predict the coding unit.

When the size of a coding unit is 2N×2N (where N is a positive integer), processing units for prediction may be 2N×2N, 2N×N, N×2N, and N×N. In other words, motion prediction may be performed based on a processing unit having a shape whereby at least one of the height and width of a coding unit is equally divided by two. Hereinafter, a processing unit, which is the base of prediction, is defined as a 'prediction unit'.

A prediction mode may be at least one from among an intra mode, an inter mode, and a skip mode, and a specific prediction mode may be performed for only a prediction unit having a specific size or shape. For example, the intra mode may be performed for only prediction units having the sizes of 2N×2N and N×N of which the shape is a square. Furthermore, the skip mode may be performed for only a prediction unit having the size of 2N×2N. If a plurality of prediction units exist in a coding unit, the prediction mode with the least encoding errors may be selected after performing prediction for every prediction unit.

Alternatively, the image encoding apparatus 100 may perform transform on image data based on a processing unit having a different size from a coding unit. For the transform in the coding unit, the transform may be performed based on a processing unit having a size equal to or smaller than that of the coding unit. Hereinafter, a processing unit, which is the base of transform, is defined as a 'transform unit'.

The encoding depth determiner 120 may determine sub coding units included in a maximum coding unit by using RD optimization based on a Lagrangian multiplier. In other words, the encoding depth determiner 120 may determine which shape a plurality of sub coding units divided from the maximum coding unit have, wherein the plurality of sub coding units have different sizes according to their depths. The image data encoder 130 outputs a bitstream by encoding the maximum coding unit based on the division shapes determined by the encoding depth determiner 120.

The encoding information encoder 140 encodes information about an encoding mode of the maximum coding unit determined by the encoding depth determiner 120. In other words, the encoding information encoder 140 outputs a bitstream by encoding information about a division shape of the maximum coding unit, information about the maximum depth, and information about an encoding mode of a sub coding unit for each depth. The information about the encoding mode of the sub coding unit may include information about a prediction unit of the sub coding unit, information about a prediction mode for each prediction unit, and information about a transform unit of the sub coding unit.

The information about the division shape of the maximum coding unit may be information, e.g., flag information, indicating whether each coding unit is divided. For example, when the maximum coding unit is divided and encoded, information indicating whether the maximum coding unit is divided is encoded. Also, when a sub coding unit divided from the maximum coding unit is divided and encoded, information indicating whether the sub coding unit is divided is encoded.

Since sub coding units having different sizes may exist for each maximum coding unit and information about an encoding mode is determined for each sub coding unit, information about at least one encoding mode may be determined for one maximum coding unit.

The image encoding apparatus 100 may generate sub coding units by equally dividing both the height and width of a maximum coding unit by two according to an increase in depth. That is, when the size of a coding unit of a $k^{th}$ depth is 2N×2N, the size of a coding unit of a $(k+1)^{th}$ depth is N×N.

Accordingly, the image encoding apparatus 100 may determine an optimal division shape for each maximum coding unit based on sizes of maximum coding units and a maximum depth in consideration of image characteristics. By variably adjusting the size of a maximum coding unit in consideration of image characteristics and encoding an image through division of a maximum coding unit into sub coding units of different depths, images having various resolutions may be more efficiently encoded.

Figure 2:
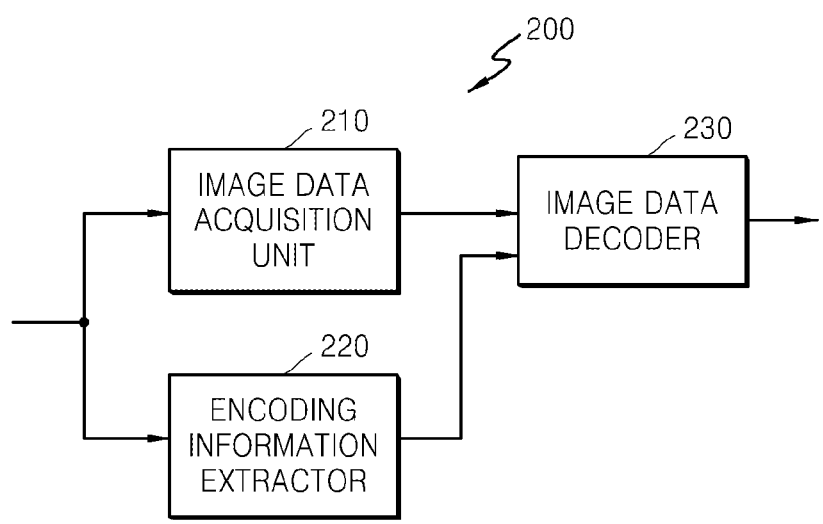
FIG. 2 is a block diagram of an image decoding apparatus according to an exemplary embodiment.

FIG. 2 is a block diagram of an image decoding apparatus 200 according to an exemplary embodiment.

Referring to FIG. 2, the image decoding apparatus 200 includes an image data acquisition unit 210, an encoding information extractor 220, and an image data decoder 230.

The image data acquisition unit 210 acquires image data according to maximum coding units by parsing a bitstream received by the image decoding apparatus 200 and outputs the image data to the image data decoder 230. The image data acquisition unit 210 may extract information about a maximum coding unit of a current frame or slice from a header of the current frame or slice. In other words, the image data acquisition unit 210 divides the maximum coding unit so that the image data decoder 230 may decode the image data according to maximum coding units.

The encoding information extractor 220 extracts information about a maximum coding unit, a maximum depth, a division shape of the maximum coding unit, an encoding mode of sub coding units from the header of the current frame by parsing the bitstream received by the image decoding apparatus 200. The information about the division shape of the maximum coding unit and the information about the encoding mode are provided to the image data decoder 230.

The information about the division shape of the maximum coding unit may include information about sub coding units having different sizes according to depths and included in the maximum coding unit. As described above, the information about the division shape may be information, e.g., flag information, indicating whether each coding unit is divided. The information about the encoding mode may include information about a prediction unit according to sub coding units, information about a prediction mode, and information about a transform unit.

The image data decoder 230 restores the current frame by decoding image data of every maximum coding unit based on the information extracted by the encoding information extractor 220.

The image data decoder 230 may decode sub coding units included in a maximum coding unit based on the information about the division shape of the maximum coding unit. The decoding may include a prediction process including intra prediction and motion compensation, and an inverse transform process.

The image data decoder 230 may perform intra prediction or inter prediction based on information about a prediction unit for each sub coding unit and information about a prediction mode in order to predict each sub coding unit. The image data decoder 230 may also perform inverse transform on each sub coding unit based on information about a transform unit of a sub coding unit.

Figure 3:
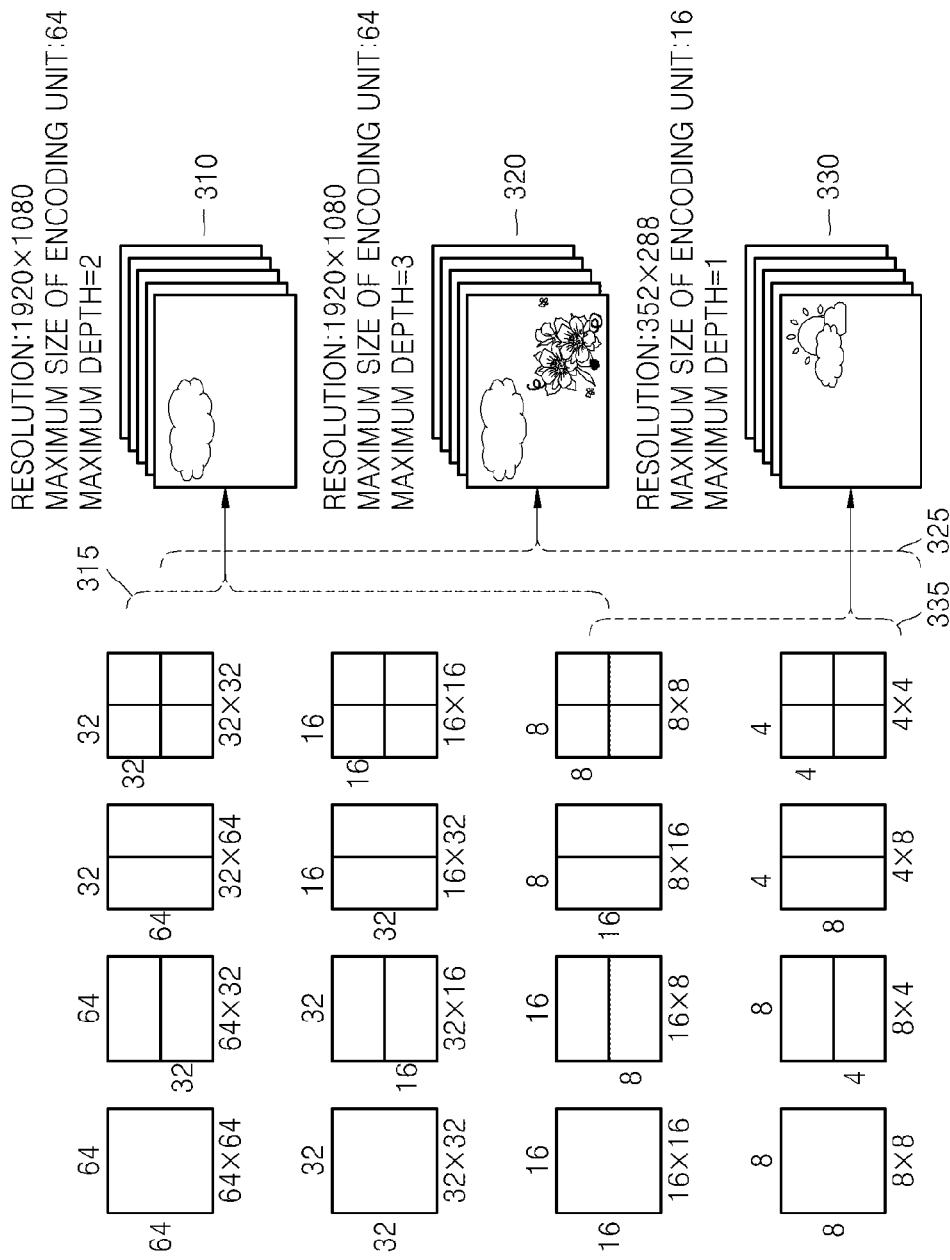
FIG. 3 illustrates hierarchical coding units according to an exemplary embodiment.

FIG. 3 illustrates hierarchical coding units according to an exemplary embodiment.

Referring to FIG. 3, the hierarchical coding units may include coding units whose widths×heights are 64×64, 32×32, 16×16, 8×8, and 4×4. Besides these coding units having perfect square shapes, coding units whose widths× heights are 64×32, 32×64, 32×16, 16×32, 16×8, 8×16, 8×4, and 4×8 may also exist.

Referring to FIG. 3, for image data 310 whose resolution is 1920×1080, the size of a maximum coding unit is set to 64×64, and a maximum depth is set to 2.

For image data 320 whose resolution is 1920×1080, the size of a maximum coding unit is set to 64×64, and a maximum depth is set to 3. For image data 330 whose resolution is 352×288, the size of a maximum coding unit is set to 16×16, and a maximum depth is set to 2.

When the resolution is high or the amount of data is great, a maximum size of a coding unit may be relatively large to increase a compression ratio and exactly reflect image characteristics. Accordingly, for the image data 310 and 320 having higher resolution than the image data 330, 64×64 may be selected as the size of a maximum coding unit.

A maximum depth indicates the total number of layers in the hierarchical coding units. Since the maximum depth of the image data 310 is 2, a coding unit 315 of the image data 310 may include a maximum coding unit whose longer axis size is 64 and sub coding units whose longer axis sizes are 32 and 16, according to an increase in a depth.

On the other hand, since the maximum depth of the image data 330 is 1, a coding unit 335 of the image data 330 may include a maximum coding unit whose longer axis size is 16 and coding units whose longer axis sizes are 8 and 4, according to an increase in a depth.

However, since the maximum depth of the image data 320 is 3, a coding unit 325 of the image data 320 may include a maximum coding unit whose longer axis size is 64 and sub coding units whose longer axis sizes are 32, 16, 8 and 4 according to an increase in a depth. Since an image is encoded based on a smaller sub coding unit as a depth increases, an exemplary embodiment is suitable for encoding an image including more minute scenes.

Figure 4:
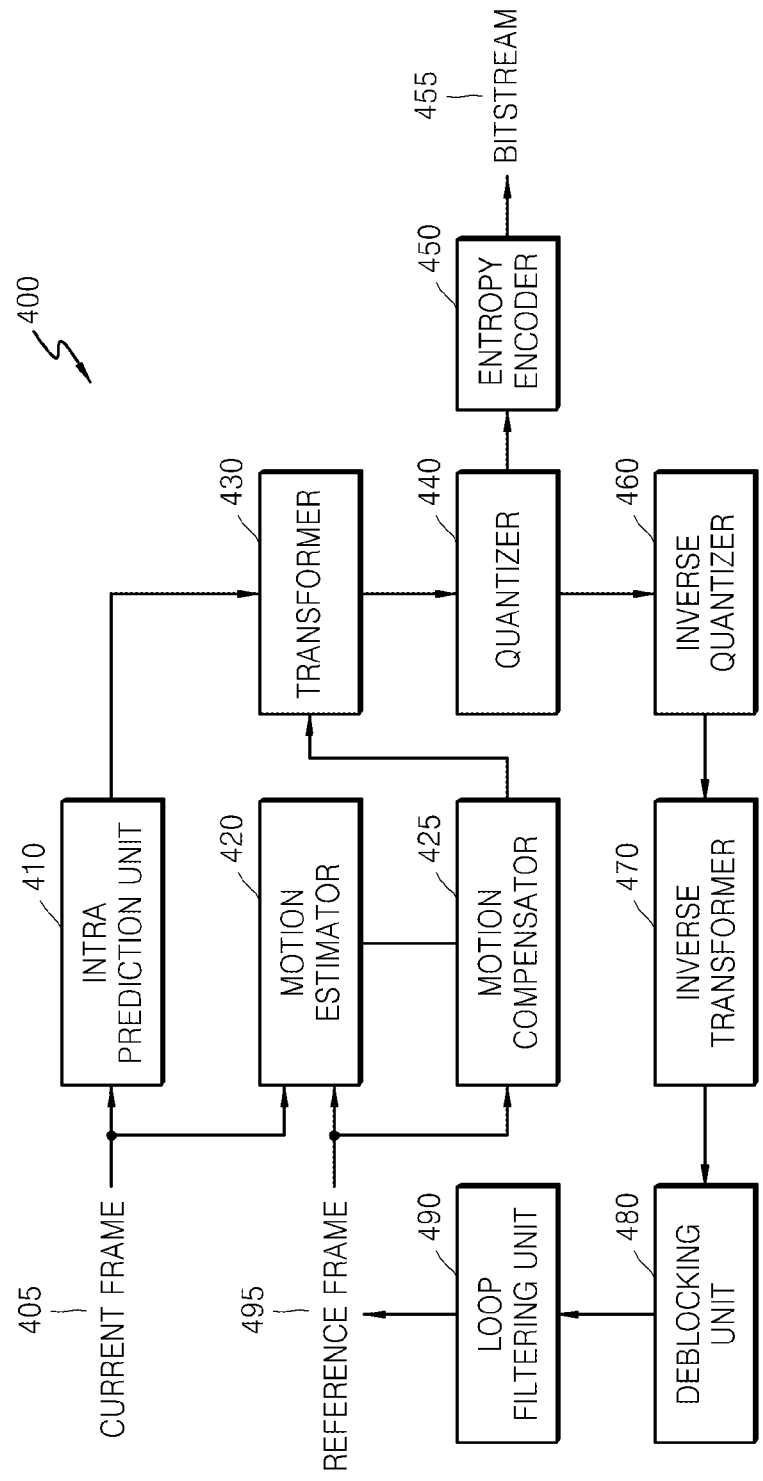
FIG. 4 is a block diagram of an image encoder based on a coding unit, according to an exemplary embodiment.

FIG. 4 is a block diagram of an image encoder 400 based on a coding unit, according to an exemplary embodiment.

An intra prediction unit 410 performs intra prediction on prediction units of the intra mode in a current frame 405, and a motion estimator 420 and a motion compensator 425 perform inter prediction and motion compensation on prediction units of the inter mode by using the current frame 405 and a reference frame 495.

Residual values are generated based on the prediction units output from the intra prediction unit 410, the motion estimator 420, and the motion compensator 425, and the generated residual values are output as quantized transform coefficients by passing through a transformer 430 and a quantizer 440.

The quantized transform coefficients are restored to the residual values by passing through an inverse quantizer 460 and an inverse transformer 470, and the restored residual values are post-processed by passing through a deblocking unit 480 and a loop filtering unit 490 and are output as the reference frame 495. The quantized transform coefficients may be output as a bitstream 455 by passing through an entropy encoder 450.

To perform encoding based on an image encoding method according to an exemplary embodiment, components of the image encoder 400, i.e., the intra prediction unit 410, the motion estimator 420, the motion compensator 425, the transformer 430, the quantizer 440, the entropy encoder 450, the inverse quantizer 460, the inverse transformer 470, the deblocking unit 480, and the loop filtering unit 490, perform image encoding processes based on a maximum coding unit, a sub coding unit according to depths, a prediction unit, and a transform unit.

Figure 5:
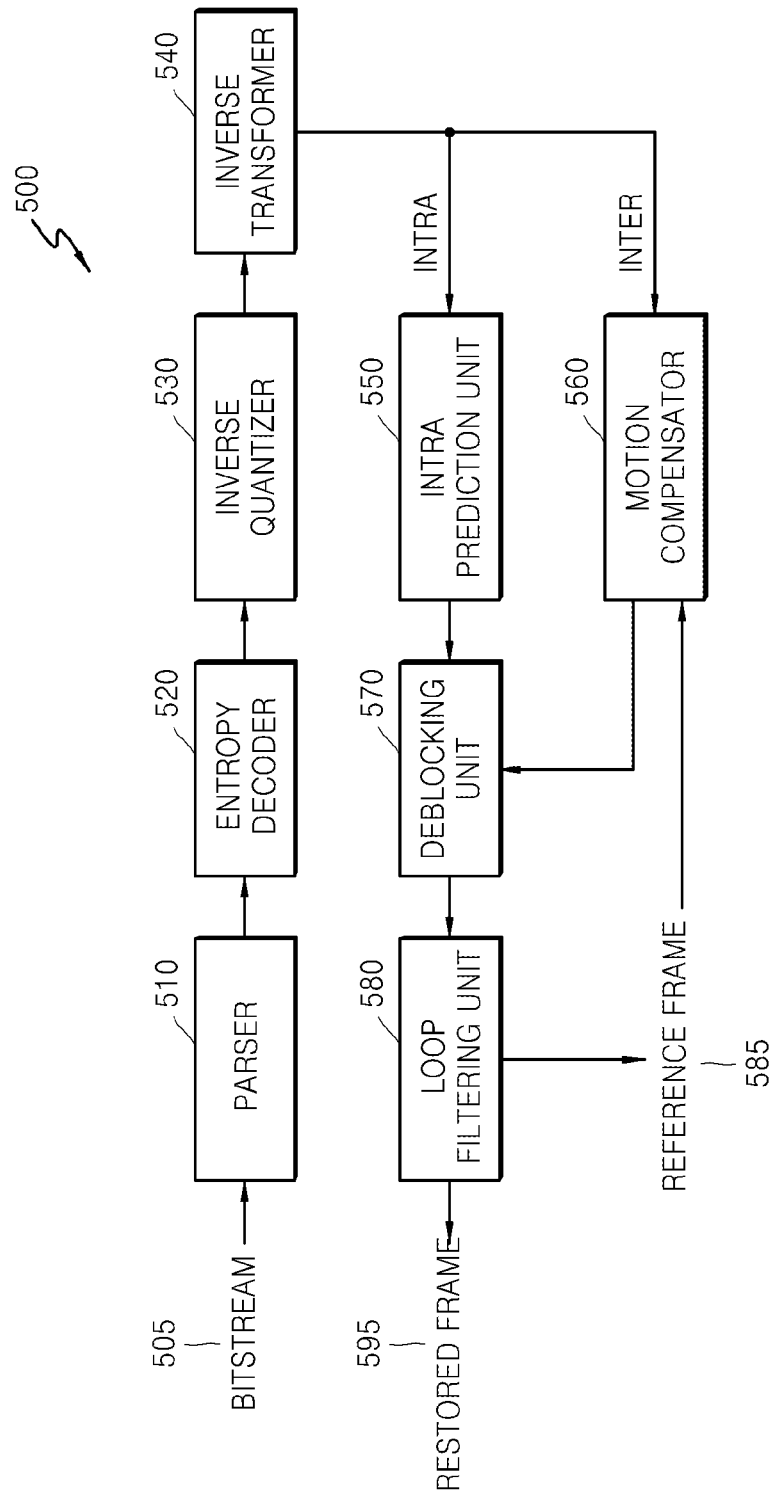
FIG. 5 is a block diagram of an image decoder based on a coding unit, according to an exemplary embodiment.

FIG. 5 is a block diagram of an image decoder 500 based on a coding unit, according to an exemplary embodiment.

Referring to FIG. 5, a bitstream 505 passes through a parser 510 so that encoded image data to be decoded and encoding information used for decoding are parsed. The encoded image data is output as inverse-quantized data by passing through an entropy decoder 520 and an inverse quantizer 530, and is restored to residual values by passing through an inverse transformer 540. The residual values are restored according to coding units by being added to an intra prediction result of an intra prediction unit 550 or a motion compensation result of a motion compensator 560. The restored coding units are used for prediction of next coding units or a next frame by passing through a deblocking unit 570 and a loop filtering unit 580.

To perform decoding based on an image decoding method according to an exemplary embodiment, components of the image decoder 500, i.e., the parser 510, the entropy decoder 520, the inverse quantizer 530, the inverse transformer 540, the intra prediction unit 550, the motion compensator 560, the deblocking unit 570, and the loop filtering unit 580, perform image decoding processes based on a maximum coding unit, a sub coding unit according to depths, a prediction unit, and a transform unit.

In particular, the intra prediction unit 550 and the motion compensator 560 determine a prediction unit and a prediction mode in a sub coding unit by considering a maximum coding unit and a depth, and the inverse transformer 540 performs inverse transform by considering the size of a transform unit.

Figure 6:
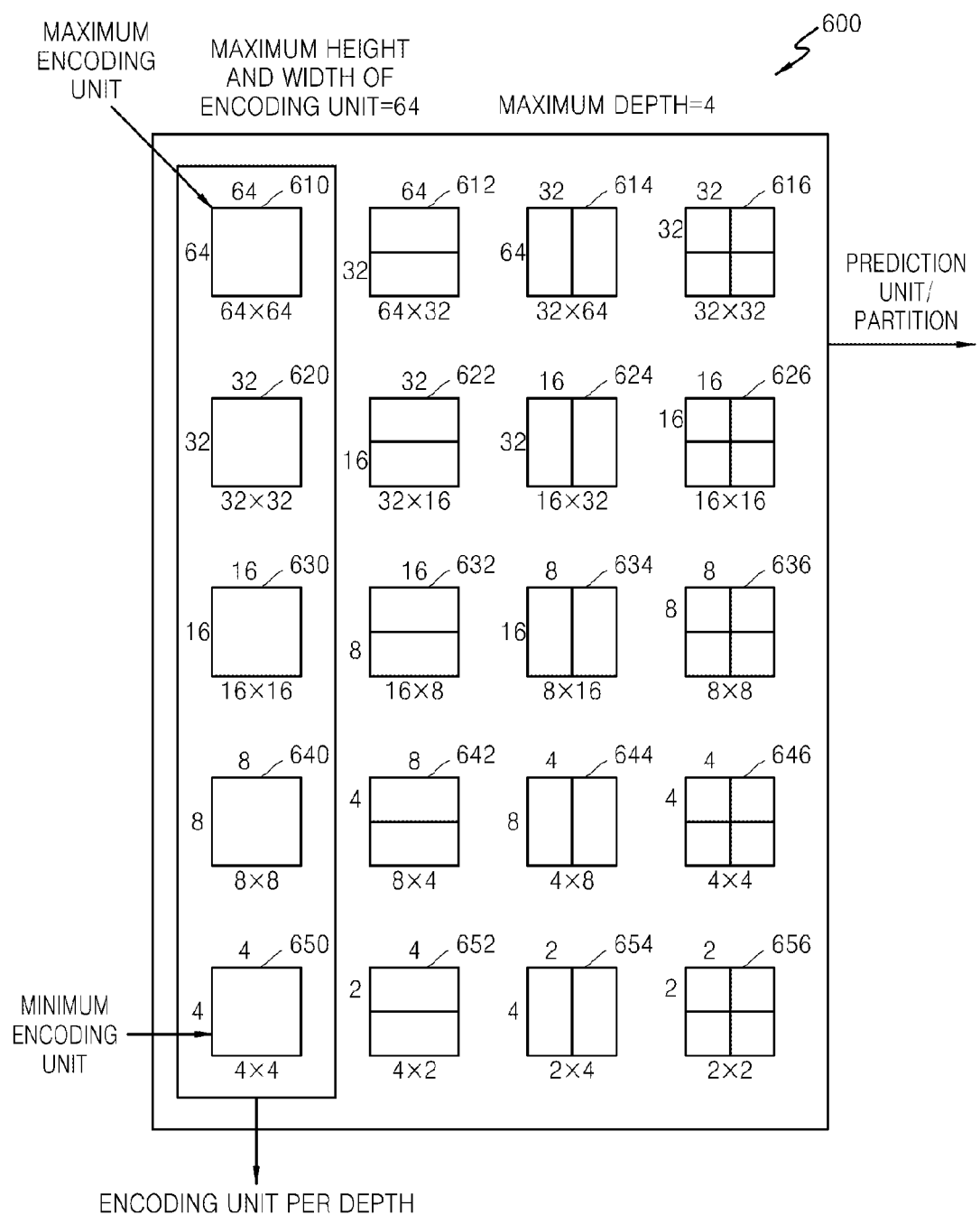
FIG. 6 illustrates a maximum coding unit, a sub coding unit, and a prediction unit, according to an exemplary embodiment.

FIG. 6 illustrates a maximum coding unit, a sub coding unit, and a prediction unit, according to an exemplary embodiment.

The image encoding apparatus 100 illustrated in FIG. 1 and the image decoding apparatus 200 illustrated in FIG. 2 use hierarchical coding units to perform encoding and decoding in consideration of image characteristics. A maximum coding unit and a maximum depth may be adaptively set according to the image characteristics or may be variously set according to requirements of a user.

In FIG. 6, a hierarchical coding unit structure 600 has a maximum coding unit 610 whose height and width are 64 and maximum depth is 4. A depth increases along a vertical axis of the hierarchical coding unit structure 600, and as a depth increases, heights and widths of sub coding units 620 to 650 decrease. Prediction units of the maximum coding unit 610 and the sub coding units 620 to 650 are shown along a horizontal axis of the hierarchical coding unit structure 600.

The maximum coding unit 610 has a depth of 0 and a coding unit size, i.e., height and width, of 64×64. A depth increases along the vertical axis, and there exist a sub coding unit 620 whose size is 32×32 and depth is 1, a sub coding unit 630 whose size is 16×16 and depth is 2, a sub coding unit 640 whose size is 8×8 and depth is 3, and a sub coding unit 650 whose size is 4×4 and depth is 4. The sub coding unit 650 whose size is 4×4 and depth is 4 is a minimum coding unit.

Referring to FIG. 6, examples of a prediction unit are shown along the horizontal axis according to each depth. That is, a prediction unit of the maximum coding unit 610 whose depth is 0 may be a prediction unit whose size is equal to the coding unit 610, i.e., 64×64, or a prediction unit 612 whose size is 64×32, a prediction unit 614 whose size is 32×64, or a prediction unit 616 whose size is 32×32, which has a size smaller than the coding unit 610 whose size is 64×64.

A prediction unit of the coding unit 620 whose depth is 1 and size is 32×32 may be a prediction unit whose size is equal to the coding unit 620, i.e., 32×32, or a prediction unit 622 whose size is 32×16, a prediction unit 624 whose size is 16×32, or a prediction unit 626 whose size is 16×16, which has a size smaller than the coding unit 620 whose size is 32×32.

A prediction unit of the coding unit 630 whose depth is 2 and size is 16×16 may be a prediction unit whose size is equal to the coding unit 630, i.e., 16×16, or a prediction unit 632 whose size is 16×8, a prediction unit 634 whose size is 8×16, or a prediction unit 636 whose size is 8×8, which has a size smaller than the coding unit 630 whose size is 16×16.

A prediction unit of the coding unit 640 whose depth is 3 and size is 8×8 may be a prediction unit whose size is equal to the coding unit 640, i.e., 8×8, or a prediction unit 642 whose size is 8×4, a prediction unit 644 whose size is 4×8, or a prediction unit 646 whose size is 4×4, which has a size smaller than the coding unit 640 whose size is 8×8.

Finally, the coding unit 650 whose depth is 4 and size is 4×4 is a coding unit of a maximum depth, and a prediction unit of the coding unit 650 may be a prediction unit whose size is equal to that of the prediction unit 650. However, even if a coding unit has a maximum depth, the size of the coding unit does not always need to be equal to that of a prediction unit thereof. Similar to the coding units 610 to 640, the coding unit 650 may also be predicted by dividing the coding unit 650 into sub coding units as prediction units.

Figure 7:
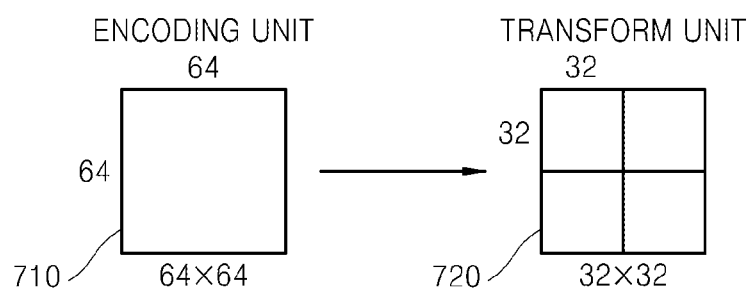
FIG. 7 illustrates a coding unit and a transform unit, according to an exemplary embodiment.

FIG. 7 illustrates a coding unit and a transform unit, according to an exemplary embodiment.

The image encoding apparatus 100 illustrated in FIG. 1 and the image decoding apparatus 200 illustrated in FIG. 2 perform encoding and decoding on a maximum coding unit itself or by dividing the maximum coding unit into at least one sub coding unit, the size of which is equal to or smaller than that of the maximum coding unit, respectively. In the encoding and decoding process, the size of a transform unit for may be selected in such a manner that a compression ratio may be maximized regardless of a coding unit and a prediction unit. For example, referring to FIG. 7, when a current coding unit 710 has the size of 64×64, transform may be performed using a transform unit 720 having the size of 32×32.

Figure 8B:
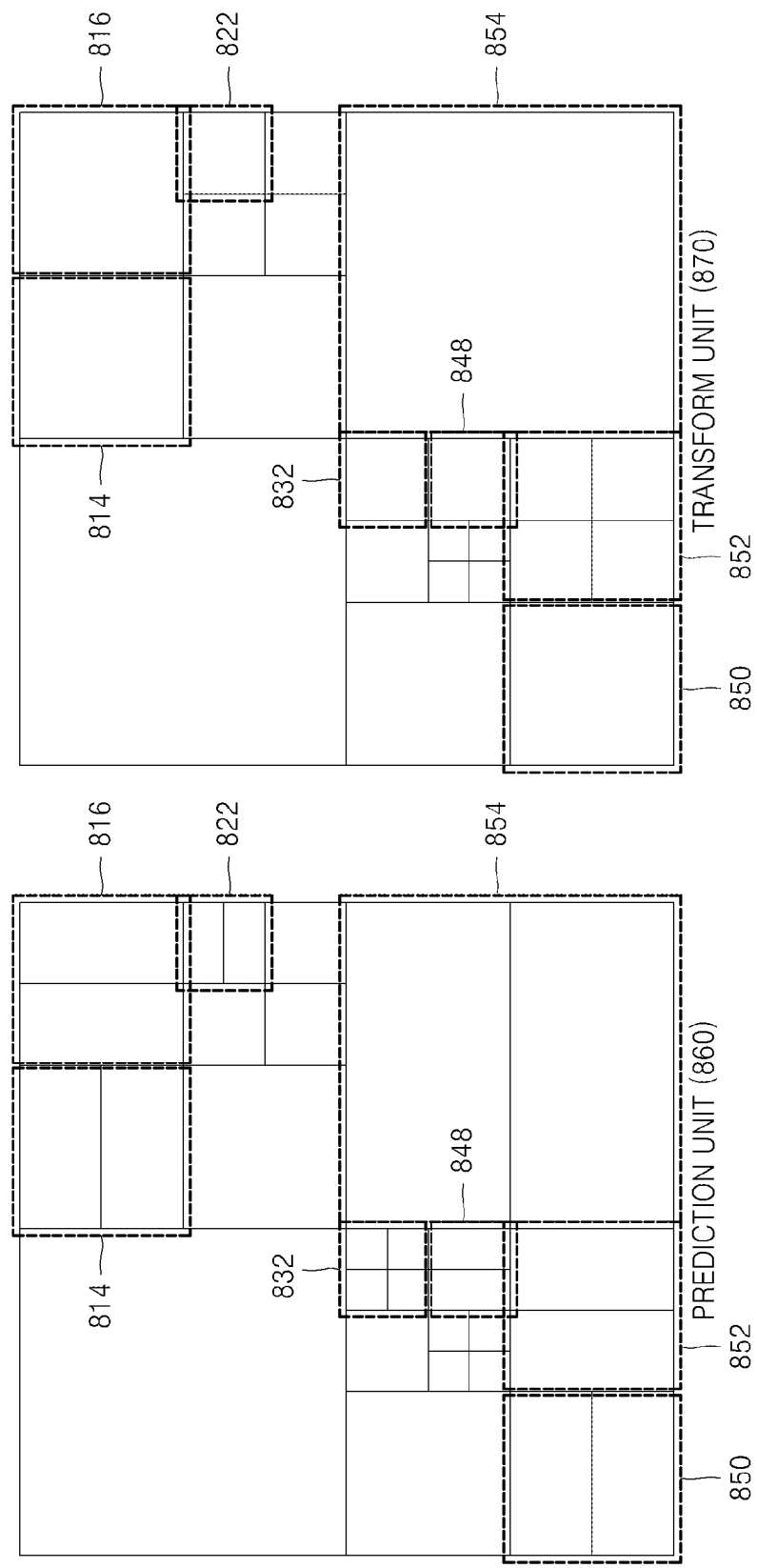

FIGS. 8A and 8B illustrate division shapes of a coding unit, a prediction unit, and a transform unit, according to an exemplary embodiment.

In FIG. 8A, a left diagram illustrates a division shape selected by the image encoding apparatus 100 illustrated in FIG. 1 in order to encode a maximum coding unit 810. The image encoding apparatus 100 divides the maximum coding unit 810 into various shapes, performs encoding, and selects an optimal division shape by comparing encoding results of various division shapes with each other based on R-D costs. When it is optimal that the maximum coding unit 810 is encoded as it is, the maximum coding unit 810 may be encoded without dividing the maximum coding unit 810 as illustrated in FIGS. 8A and 8B.

In the left diagram in FIG. 8A, the maximum coding unit 810 whose depth is 0 is encoded by dividing it into sub coding units whose depths are equal to or greater than 1. That is, the maximum coding unit 810 is divided into four sub coding units whose depths are 1, and all or some of the sub coding units whose depths are 1 are divided into sub coding units whose depths are 2.

A sub coding unit located in an upper-right side and a sub coding unit located in a lower-left side among the sub coding units whose depths are 1 are divided into sub coding units whose depths are equal to or greater than 2. Some of the sub coding units whose depths are equal to or greater than 2 may be divided into sub coding units whose depths are equal to or greater than 3.

In FIG. 8A, a right diagram illustrates a division shape of a prediction unit for the maximum coding unit 810.

In the right diagram in FIG. 8A, a prediction unit 860 for the maximum coding unit 810 may be divided differently from the maximum coding unit 810. In other words, a prediction unit for each of the sub coding units may be smaller than a corresponding sub coding unit.

For example, a prediction unit for a sub coding unit 854 located in a lower-right side among the sub coding units whose depths are 1 may be smaller than the sub coding unit 854. In addition, prediction units for some sub coding units 814, 816, 850, and 852 from among sub coding units 814, 816, 818, 828, 850, and 852 whose depths are 2 may be smaller than the sub coding units 814, 816, 850, and 852, respectively.

In addition, prediction units for sub coding units 822, 832, and 848 whose depths are 3 may be smaller than the sub coding units 822, 832, and 848, respectively. The prediction units may have a shape whereby respective sub coding units are equally divided by two in a direction of height or width or have a shape whereby respective sub coding units are equally divided by four in directions of height and width.

FIG. 8B illustrates a prediction unit and a transform unit, according to an exemplary embodiment.

In FIG. 8B, a left diagram illustrates a division shape of a prediction unit for the maximum coding unit 810 shown in FIG. 8A, and a right diagram illustrates a division shape of a transform unit of the maximum coding unit 810.

In the right diagram of FIG. 8B, a division shape of a transform unit 870 may be set differently from the prediction unit 860.

For example, even though a prediction unit for the coding unit 854 whose depth is 1 is selected having a shape whereby the height of the coding unit 854 is equally divided by two, a transform unit may be selected having the same size as the coding unit 854. Likewise, even though prediction units for coding units 814 and 850 whose depths are 2 are selected having a shape whereby the height of each of the coding units 814 and 850 is equally divided by two, a transform unit may be selected having the same size as the original size of each of the coding units 814 and 850.

A transform unit may be selected having a smaller size than a prediction unit. For example, when a prediction unit for the coding unit 852 whose depth is 2 is selected having a shape whereby the width of the coding unit 852 is equally divided by two, a transform unit may be selected having a shape whereby the coding unit 852 is equally divided by four in directions of height and width.

Figure 9:
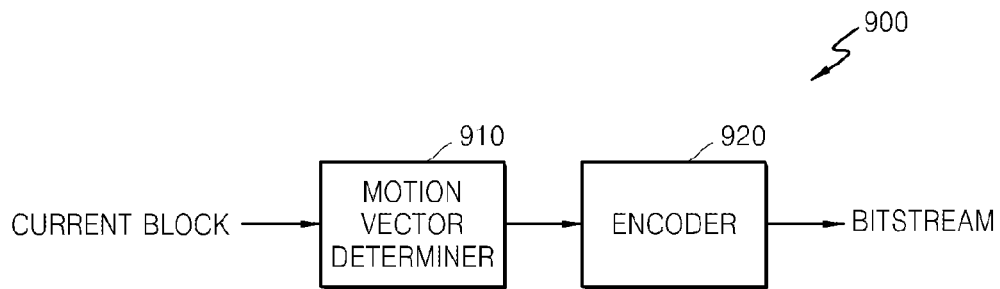
FIG. 9 is a block diagram of an image encoding apparatus according to another exemplary embodiment.

FIG. 9 is a block diagram of an image encoding apparatus 900, according to another exemplary embodiment. Referring to FIG. 9, the image encoding apparatus 900 may be included in the image encoding apparatus 100 of FIG. 1 or the image encoder 400 of FIG. 4 to encode a current block based on inter prediction.

Referring to FIG. 9, the image encoding apparatus 900 includes a motion vector determiner 910 and an encoder 920.

In some encoding modes, a motion vector of a current block is determined based on a motion vector of at least one block that has been previously encoded, and the current block is encoded based on the determined motion vector. Examples of these encoding modes are a direct prediction mode and a skip mode. In both the director prediction mode and the skip mode, a motion vector of a current block is determined based on information that has been previously encoded and the motion vector of the current block is not additionally encoded as information regarding the current block.

However, in the direct prediction mode, residual blocks produced by subtracting a predicted block produced using a motion vector from the current block is encoded as information regarding pixel values, whereas in the skip mode, a predicted block is considered the same as a current block and only flag information indicating that encoding is performed in the skip mode is encoded as information regarding pixel values.

Although both the direct prediction mode and the skip mode are encoding modes based on inter prediction, a compression ratio is high since a motion vector is not additionally encoded. However, in the direct prediction mode and the skip mode, since the current block is encoded by predicting the current block only in a particular direction, a hit ratio of each of these modes and the precision of prediction may be low. Thus, when a current block included in a bi-directionally predicted picture is encoded according to the direct prediction mode or the skip mode, the image encoding apparatus 900 encodes the current block by performing prediction in various directions as will be described in detail below.

Figure 10:
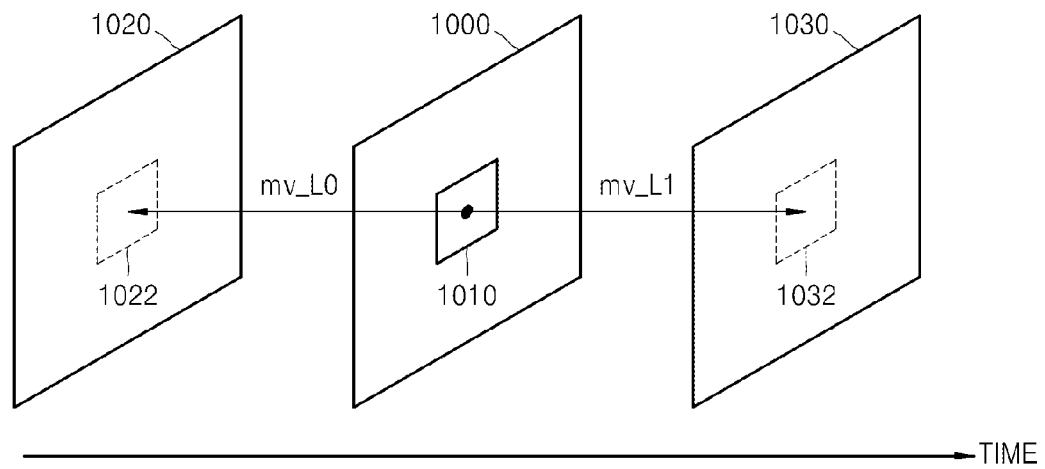
FIG. 10 is a diagram illustrating a method of predicting a block included in a bi-directionally predicted picture, according to an exemplary embodiment.

FIG. 10 is a diagram illustrating a method of predicting a block included in a bi-directionally predicted picture, according to an exemplary embodiment.

Referring to FIG. 10, a current block 1010 included in a current picture 1000 which is a bi-directionally predicted picture is prediction-encoded by referring to at least one from among a previous picture 1020 preceding the current picture 1000 and a subsequent picture 1030 following the current picture 1000. At least one block corresponding to the current block 1010, e.g., a previous block 1022 and a subsequent block 1032, are detected from at least one from among the previous picture 1020 and the subsequent picture 1030, and the current block 1010 is then prediction-encoded based on the detected block 1022 or 1032.

In other words, if a direction from the current picture 1000 to the previous picture 1020 is a first direction (L0 direction), the current block 1010 may be predicted based on the previous block 1022 detected from the previous picture 1020 in the first direction (hereinafter referred to as 'first-direction prediction'). Likewise, if a direction from the current picture 1000 to the subsequent picture 1030 is a second direction (L1 direction), the current block 1010 may be predicted based on the subsequent block 1032 detected from the subsequent picture 1030 in the second direction (hereinafter referred to as 'second-direction prediction'). Also, both the first-direction prediction and the second-direction prediction may be performed on the current block 1010, i.e., the current block 1010 may be predicted bi-directionally.

However, the direct prediction mode according to the related art may be performed only when the current block 1010 is predicted bi-directionally. In other words, the current block 1010 cannot be encoded in the direct prediction mode when the current block 1010 is prediction-encoded based on first-direction prediction or second-direction prediction. Likewise, the skip mode according to the related art may be performed only when the current block 1010 is predicted bi-directionally. In the skip mode according to the related art, a motion vector of the current block 1010 determined based on a motion vector of a previous block adjacent to the current block 1010 is a motion vector mv_L0 in the first direction, a predicted block produced according to the first-direction prediction is considered the same as the current block 1010, and flag information indicating encoding is performed according to the skip mode is encoded.

That is, according to the related art, the direct prediction mode and the skip mode may be used only when prediction is performed in a particular direction although first-direction prediction, second-direction prediction, and bi-directional prediction may be performed on a block included in a bi-directionally predicted picture. Accordingly, use of the direct prediction mode and the skip mode leading to an increase in a compression ratio is limited.

To solve this problem, the image encoding apparatus 900 according to the current exemplary embodiment performs encoding according to an image encoding method, in which a motion vector of the current block 1010 is determined based on previously encoded information and prediction may be performed in various directions without having to encode the motion vector.

The motion vector determiner 910 determines a first-direction motion vector and a second-direction motion vector of the current block 1010 so as to perform first-direction prediction, second-direction prediction, and bi-directional prediction. The first-direction motion vector and the second-direction motion vector are determined based on a motion vector of at least one block that has been previously encoded before encoding of the current block 1010.

The first-direction motion vector and the second-direction motion vector may be determined using a method of determining a motion vector according to the related art. For example, if the current block 1010 is encoded based on the direct prediction mode in which information regarding the motion vector thereof is not encoded but information regarding residual blocks is encoded, then the motion vector may be determined using a method of determining a motion vector according to an H.264/AVC-based direct prediction mode. If the current block 1010 is encoded based on the skip mode in which both the information regarding the motion vector and the information regarding the residual blocks are not encoded, then the motion vector may be determined using a method of determining a motion vector according to an H.264/AVC-based skip mode.

The H.264/AVC-based direct prediction mode may be classified into a temporal direct prediction mode and a spatial direct prediction mode. Thus, the motion vector determiner 910 may determine the first-direction motion vector and the second-direction motion vector by using a method of determining a motion vector in the H.264/AVC-based temporal direct prediction mode or by using a method of determining a motion vector in the H.264/AVC-based spatial direct prediction mode. These methods will now be described in detail with reference to FIGS. 11A and 11B.

Figure 11A:
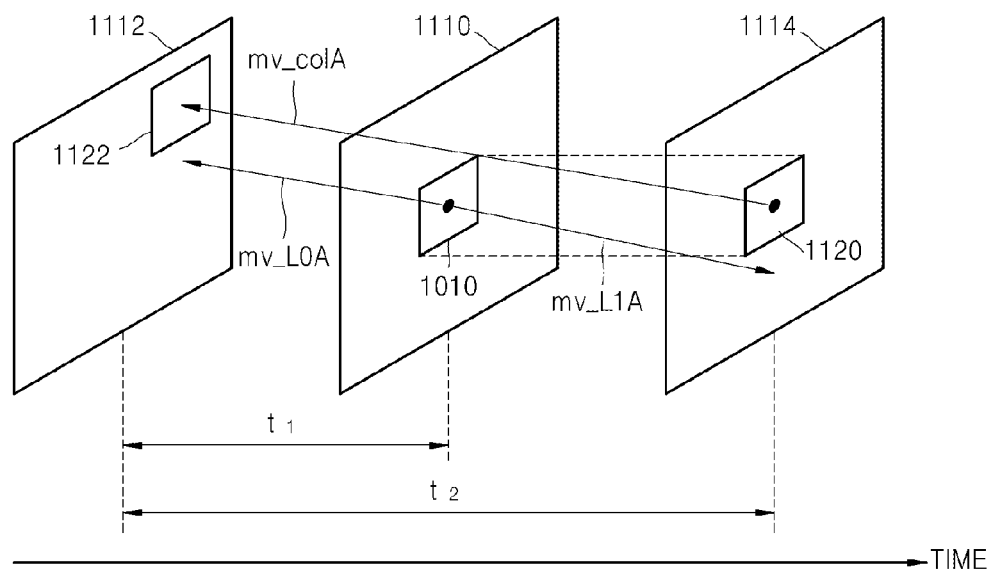
FIGS. 11A and 11B are diagrams illustrating methods of determining a motion vector of a current block based on a motion vector of a previously encoded block, according to exemplary embodiments.

FIG. 11A is a diagram illustrating a method of determining a motion vector of a current block based on a motion vector of a previously encoded block, according to an exemplary embodiment.

Referring to FIG. 11A, when a current block 1010 included in a current picture 1110 is encoded based on the temporal direct prediction mode, a motion vector of the current block 1010 may be produced using a motion vector mv_colA of a subsequent block 1120, which is included in a subsequent picture 1114 following the current picture 1110 and is collocated with the current block 1010.

In other words, if the subsequent picture 1114 is an anchor picture, a first-direction motion vector mv_L0A and second-direction motion vector mv_L1A of the current block 1010 may be determined using the motion vector mv_colA of the subsequent block 1120 included in the anchor picture 1114. The first-direction motion vector mv_L0A and second-direction motion vector mv_L1A of the current block 1010 may be determined by scaling the motion vector mv_colA of the subsequent block 1120 based on the temporal distance between the current picture 1110 and a previous picture 1112 preceding the current picture 1110 and the temporal distance between the anchor picture 1114 and the previous picture 1112.

For example, if the motion vector mv_colA of the subsequent block 1120 is produced with respect to a block 1122 detected from the previous picture 1112, then the first-direction motion vector mv_L0A and second-direction motion vector mv_L1A of the current block 1110 may be produced using the following equations:

$$mv\_L0A = (t1/t2)*mv\_colA$$

$$mv\_L1A = mv\_L0A - mv\_colA,$$

wherein 'mv_L0A' and 'mv_L1A' denote the first-direction motion vector and the second-direction motion vector of the current block 1010, respectively.

Figure 11B:
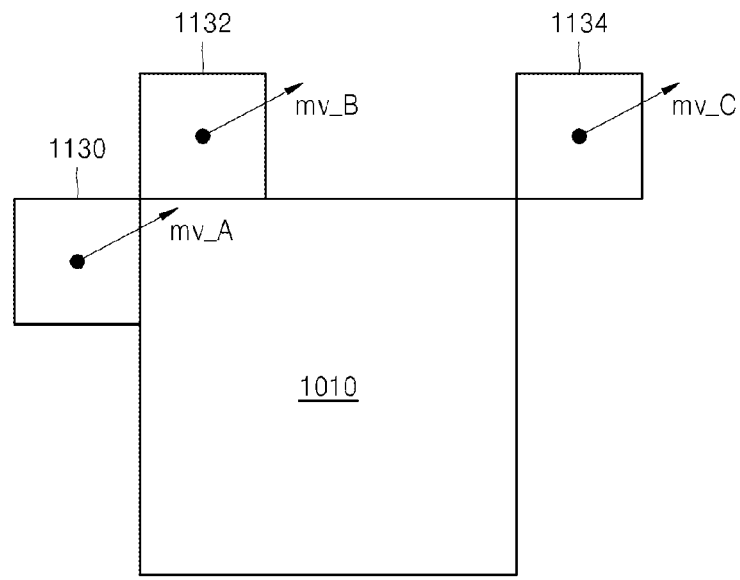

FIG. 11B is a diagram illustrating a method of determining a motion vector of a current block based on a motion vector of a previously encoded block, according to another exemplary embodiment.

Referring to FIG. 11B, a first-direction motion vector and a second-direction motion vector of a current block 1010 may be determined based on motion vectors mv_A, mv_B, and mv_C of blocks 1130, 1132, and 1134 adjacent to the current block 1100. The first-direction motion vector and the second-direction motion vector of the current block 1010 may be determined based on motion vectors of blocks located on the left, upper, and uppermost right sides of the current block 1010.

When the current block 1010 is encoded according to the spatial direct prediction mode, a median between at least one first-direction motion vector from among the motion vectors mv_A, mv_B, and mv_C is determined as the first-direction motion vector of the current block 1010, and a median value between at least one second-direction motion vector from among the motion vectors mv_A, mv_B, and mv_C is determined as the second-direction motion vector of the current block 1010. The first-direction motion vector is determined by calculating the median between the at least one first-direction motion vector by setting the at least one second-direction motion vector to '0', and the second-direction motion vector is determined by calculating the median between at least one second-direction motion vector by setting the at least one first-direction motion vector to '0'.

A picture corresponding to a smallest first-direction reference index from among reference pictures determined by the motion vectors mv_A, mv_B, and mv_C is determined as a first-direction reference picture, and a picture corresponding to a smallest second-direction reference index from among reference pictures determined by the motion vectors mv_A, mv_B, and mv_C is determined as a second-direction reference picture.

When the current block 1010 is encoded according to the skip mode, a median between at least one first-direction motion vector from among the motion vectors mv_A, mv_B, and mv_C of the blocks 1130, 1132, and 1134 adjacent to the current block 1010, may be determined as the motion vector of the current block 1010 as illustrated in FIG. 11B.

If the image encoding apparatus 900 of FIG. 9 determines a motion vector of a current block and encodes the current block as described above with reference to FIG. 11A or 11B, a decoding side may determine the motion vector of the current block and restore a current picture as described above with reference to FIG. 11A or 11B. In other words, an image encoding side and an image decoding side may implicitly share the same method of determining a motion vector and determine a motion vector of a current block according to the shared method.

However, according to another exemplary embodiment, an image encoding side may produce a plurality of motion vector candidates based on motion vectors of a plurality of previous blocks encoded before encoding of a current block, explicitly encode information defining a motion vector of the current block from among the plurality of motion vector candidates, and insert a result of the encoding into a bitstream. In this case, an image decoding side may determine the motion vector of the current block based on the result of the encoding, which is inserted into the bitstream. Such a method will now be described above with reference to FIGS. 12A and 12B.

Figure 12A:
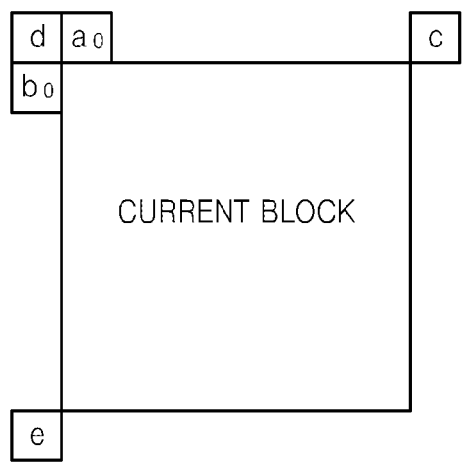
FIGS. 12A and 12B are diagrams illustrating methods of determining a motion vector of a current block based on a motion vector of a previously encoded block, according to exemplary embodiments.
Figure 12B:
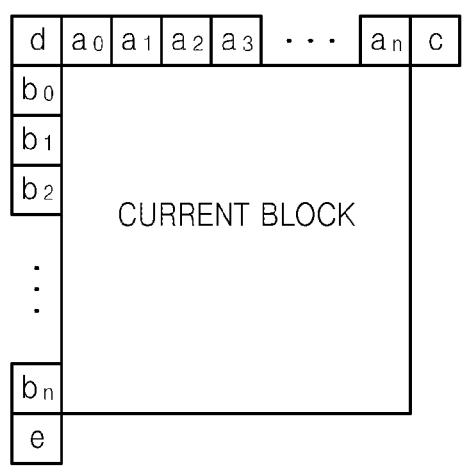

FIGS. 12A and 12B are diagrams illustrating methods of determining a motion vector of a current block based on a motion vector of a previously encoded block, according to exemplary embodiments.

Referring to FIG. 12A, the motion vector determiner 910 of FIG. 9 may produce a plurality of motion vector candidates based on motion vectors of previously encoded blocks adjacent to a current block. The plurality of motion vector candidates may be motion vectors of a leftmost block $a_0$ from among blocks adjacent to an upper side of the current block, an uppermost block $b_0$ adjacent to a left side of the current block, a block c adjacent to a right, upper side of the current block, a block d adjacent to a left, upper side of the current block, and a block e adjacent to a left, lower side of the current block.

One of first-direction motion vectors from among the motion vectors of the leftmost block $a_0$, the uppermost block $b_0$, the block c, and the block d may be determined as a first-direction motion vector of the current block. One of second-direction motion vectors from among the motion vectors of the leftmost block $a_0$, the uppermost block $b_0$, the block c, and the block d may be determined as a second-direction motion vector of the current block. For example, if the motion vectors of the leftmost block $a_0$ and the uppermost block $b_0$ from among the leftmost block $a_0$, the uppermost block $b_0$, the block c, and the block d are first-direction motion vectors, then one of the motion vectors of the leftmost block $a_0$ and the uppermost block $b_0$ may be determined as the first-direction motion vector of the current block and one of the motion vectors of the block c and the block d may be determined as the second-direction motion vector of the current block.

Various methods may be used to determine one of the plurality of motion vector candidates as a motion vector of the current block. For example, a motion vector of the current block may be selected in such a way that the current block may be more exactly predicted based on the motion vector. If the current block is more exactly predicted when the motion vector of the leftmost block $a_0$ is used from among the motion vectors of the leftmost block $a_0$ and the uppermost block $b_0$ which are the first-direction motion vectors, then the motion vector of the leftmost block $a_0$ may be determined as the first-direction motion vector of the current block. Predicted blocks, which are obtained by predicting the current block by using the motion vectors of the plurality of motion vector candidates, respectively, may be subtracted from the current block so as to produce residual blocks, the sum of absolute differences (SAD) of each of the residual blocks may be calculated, and then, a motion vector having the least SAD from among the plurality of motion vector candidates may be determined as a motion vector of the current block.

Referring to FIG. 12B, motion vectors of all of blocks adjacent to the current block may be used as a plurality of motion vector candidates. In other words, not only motion vectors of blocks adjacent to the upper side of the current block, including the leftmost block $a_0$ but also motion vectors of blocks adjacent to the left side of the current block, including the uppermost block $b_0$ may be used as the plurality of motion vector candidates.

As described above with reference to FIG. 12B, one of first-direction motion vectors and one of second-direction motion vectors from among a plurality of motion vector candidates of all blocks adjacent to a current block may be determined as a first-direction motion vector and a second-direction motion vector of the current block, respectively.

Accordingly, referring to FIGS. 11A, 11B, 12A, and 12B, the motion vector determiner 910 may determine one of a plurality of motion vector candidates as a motion vector of a current block by using the following equation:

$$C=\{median(mv\_a0, mv\_b0, mv\_c), mv\_a0,$$
$$mv\_a1\ldots, mv\_aN, mv\_b0, mv\_b1,\ldots,$$
$$mv\_bN, mv\_c, mv\_d, mv\_e, mv\_L0A,$$
$$mv\_L1A\},$$

wherein 'mv_L0A' and 'mv_L1A' may denote motion vectors obtained according to the method of FIG. 11A, and 'median(mv_a0, mv_b0, mv_c)' may denote a motion vector obtained according to the method of FIG. 11B. The other motion vectors are as described above with reference to FIGS. 12A and 12B.

A first-direction motion vector of the current block may be determined from among first-direction motion vectors included in the C set described above, and a second-direction motion vector of the current block may be determined from among second-direction motion vectors included in the C set.

According to another exemplary embodiment, the total number of motion vector candidates may be determined to be small and a motion vector of the current block may be determined from among the motion vector candidates, based on the following equation:

$$C=\{median(mv\_a', mv\_b', mv\_c'), mv\_a', mv\_b',$$
$$mv\_c', mv\_L0A, mv\_L1A\},$$

wherein 'mv_x' denotes a motion vector of a block x, 'median( )' denotes a median, and 'mv_a' denotes a first effective motion vector from among motion vectors mv_a0, mv_a1 . . . , mv_aN. For example, if a block a0 is encoded using inter prediction, a motion vector mv_a0 of the block a0 is not effective, and thus, mv_a'=mv_a1. If a motion vector mv_a1 of a block a1 is not also effective, then mv_a'=mv_a2.

Likewise, 'mv_b' denotes a first effective motion vector from among the motion vectors mv_b0, mv_b1, . . . , mv_bN, and 'mv_c' denotes a first effective motion vector from among the motion vectors mv_c, mv_d, and mv_e.

'mv_L0A' and 'mv_L1A' may denote motion vectors obtained according to the method of FIG. 11A. According to another exemplary embodiment, a motion vector produced using a temporal distance between adjacent pictures may be used as a motion vector candidate, instead of the motion vectors mv_L0A and mvL1A. This exemplary embodiment will be described in detail with reference to FIGS. 13A and 13B.

Figure 13A:
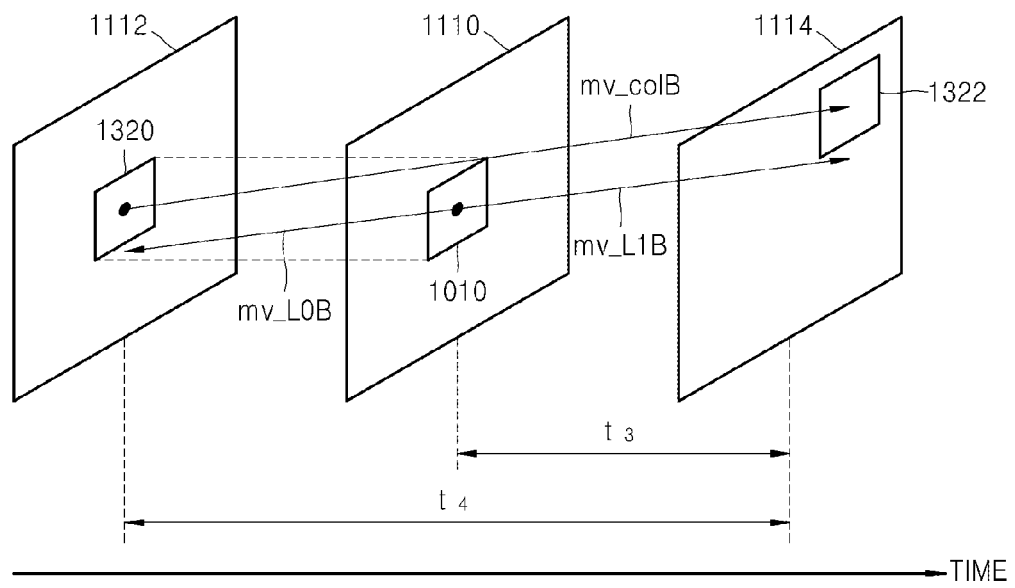
FIGS. 13A and 13B are diagrams illustrating methods of determining a motion vector of a current block based on a motion vector of a previously encoded block, according to exemplary embodiments.
Figure 13B:
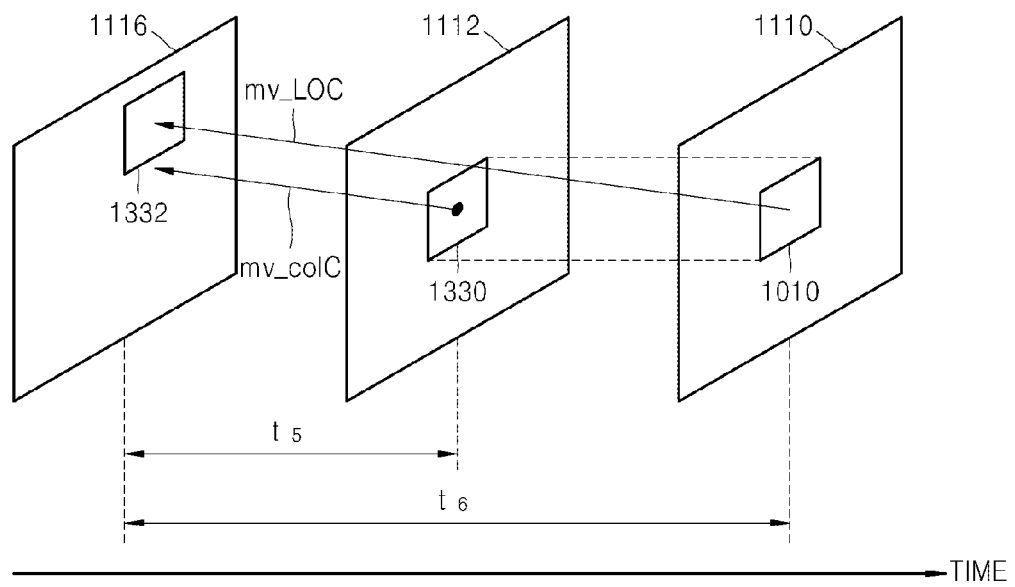

FIGS. 13A and 13B are diagrams illustrating methods of determining a motion vector of a current block based on a motion vector of a previously encoded block, according to exemplary embodiments.

Referring to FIG. 13A, a temporal distance-based motion vector candidate may be determined differently from the temporal direct prediction mode according to the related art.

A motion vector candidate of a current block 1010 included in a current picture 1110 may be produced from a motion vector of a block 1320 that is included in a previous picture 1112 preceding the current picture 1110 and is collocated with the current block 1010. For example, if a motion vector mv_colB of the block 1320 that is collocated with the current block 1010 is produced with respect to a block 1322 detected from a subsequent picture 1114, then motion vector candidates mv_L0B and mv_L1B of the current block 1010 may be produced using the following equations:

$$mv\_L1B=(t3/t4)*\ mv\_colB$$

$$mv\_L0B=mv\_L1B-mv\_colB.$$

wherein 'mv_L0B' denotes a first-direction motion vector candidate of the current block 1010, and 'mv_L1B' denotes a second-direction motion vector candidate of the current block 1010.

Referring to FIG. 13B, a motion vector candidate mv_L0C of a current block 1010 included in a current picture 1110 may be determined using a motion vector mv_colC of a block 1330 that is included in a previous picture 1112 and that is collocated with the current block 1010. For example, when the motion vector mv_colC of the block 1330 collocated with the current block 1010 is produced with respect to a block 1332 detected from another previous picture 1116, the motion vector candidate mv_L0C of the current block 1010 may be produced using the following equation:

$$mv\_L0C=(t6/t5)\times mv\_colC$$

The motion vector candidates mv_L0B and mv_L1B described above with reference to FIGS. 13A and 13B may be included in the C set described above of the motion vector candidates of the current block 1010 described above. That is, the motion vector candidates mv_L0B and mv_L1B may be included in the C set, instead of the motion vector candidates mv_L0A and mv_L1A or may be additionally included in the C set.

Referring back to FIG. 9, if the motion vector determiner 910 determines a motion vector of a current block based on motion vectors of previously encoded blocks, the encoder 920 encodes information regarding the current block.

If a first-direction motion vector and a second-direction motion vector of the current block are determined, the encoder 920 performs first-direction prediction, second-direction prediction, and bi-directional prediction based on the first-direction motion vector and the second-direction motion vector. Then, a prediction direction in which the current block may be most exactly predicted is determined. Predicted blocks obtained by performing first-direction prediction, second-direction prediction, and bi-directional prediction may be compared with the current block, and a direction in which a residual block having the least SAD may be produced may be determined as the prediction direction. Otherwise, the prediction direction may be determined by performing first-direction prediction, second-direction prediction, and bi-directional prediction, encoding results of the performing, and comparing results of the encoding with one another based on RD costs.

After the prediction direction is determined, information regarding the prediction direction and information regarding pixel values are encoded. The information regarding the prediction direction may be encoded as a sequence parameter, a slice parameter, or a block parameter. A predetermined index value (e.g., binary number) may be assigned to a first direction, a second direction, and bi-directions, a binary number corresponding to a prediction direction in which the current block is encoded may be entropy-encoded, and then a result of the entropy-encoding may be inserted into a bitstream.

As the information regarding pixel values, information regarding residual blocks, e.g., the direct prediction mode, may be additionally encoded. Residual blocks may be obtained by subtracting predicted blocks, which are produced by performing prediction in the determined prediction direction, from the current block, frequency-domain coefficients may be produced by performing transform on the residual blocks, and then, the frequency-domain coefficients may be quantized and entropy-encoded. The transform may be DCT transform or KLT transform.

Also, as the information regarding pixel values, only the skip mode according to the related art and flag information indicating that a predicted block and the current block are the same may be encoded. That is, only the skip mode and the flag information may be encoded since a predicted block obtained by performing prediction in the determined prediction direction is considered the same as the current block.

A reference picture for predicting the current block may be inferred based on reference indexes of previously encoded blocks. As described above with reference to FIG. 11B, a reference index of the current block and a reference picture corresponding to the current block may be determined based on the reference indexes of the previously encoded blocks. Also, a reference picture corresponding to a motion vector determined by the motion vector determiner 910 may be determined as a reference picture of the current block. For example, as described above with reference to FIG. 11A, if the motion vector mv_L0A is determined as a first-direction motion vector of the current block, the previous picture 1112 according to the motion vector mv_L0A may be automatically determined as the reference picture of the current block.

If the motion vector determiner 910 explicitly determines a first-direction motion vector and a second-direction motion vector from among a plurality of motion vector candidates as described above with reference to FIGS. 12A, 12B, 13A, and 13B, then the encoder 920 may encode information indicating at least one from among the first-direction motion vector and the second-direction motion vector.

If the prediction direction is determined as the first direction, information indicating only the first-direction motion vector from among the plurality of motion vector candidates is encoded. If the prediction direction is determined as the second direction, only information indicating the second-direction motion vector may be encoded. However, if prediction direction is determined to be performed bi-directionally, information indicating the first-direction motion vector and the second-direction motion vector from among the plurality of motion vector candidates may be encoded.

Binary numbers may be assigned to all of the motion vectors included in the C set described above, respectively, and the binary numbers assigned to the first-direction motion vector and/or the second-direction motion vector determined as motion vectors of the current block may be encoded. However, since as described above, one of the first-direction motion vectors in the C set is determined as the first-direction motion vector of the current block, the binary number assigned to the first-direction motion vector of the current block from among the binary numbers assigned to the first-direction motion vectors in the C set may be encoded as the information indicating the first-direction motion vector. Likewise, the binary number assigned to the second-direction motion vector of the current block from among the binary numbers assigned to the second-direction motion vectors in the C set may be encoded as information indicating the second-direction motion vector.

Figure 14:
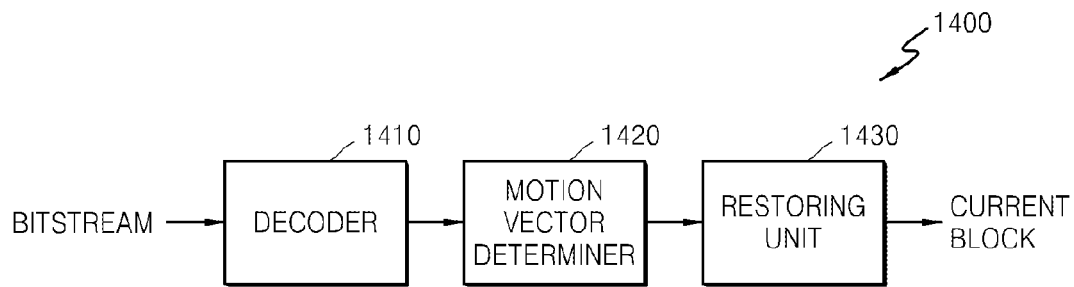
FIG. 14 is a block diagram of an image decoding apparatus according to another exemplary embodiment.

FIG. 14 is a block diagram of an image decoding apparatus 1400 according to another exemplary embodiment. The image decoding apparatus 1400 may be included in the image decoding apparatus 200 of FIG. 2 or the image encoding apparatus 500 of FIG. 5 and may decode a current block by performing inter prediction.

Referring to FIG. 14, the image decoding apparatus 1400 includes a decoder 1410, a motion vector determiner 1420, and a restoring unit 1430.

The decoder 1410 receives a bitstream containing data regarding the current block, and decodes information regarding a prediction direction in which the current block is predicted. The image decoding apparatus 1400 determines a motion vector of the current block based on a motion vector of at least one block that has been previously decoded before decoding of the current block, and decodes the current block in a decoding mode, in which the current block is restored based on the determined motion vector. Thus, the information regarding the prediction direction is decoded before the motion vector of the current block is determined. The information regarding the prediction direction may be, for example, a sequence parameter, a slice parameter, or a block parameter, which is included in the bitstream.

In an encoding/decoding mode, e.g., the direct prediction mode or the skip mode, in which a motion vector of a current block is determined based on a motion vector of a previously encoded/decoded block according to a related art, the current block is encoded/decoded based only on prediction performed in a particular direction. However, in an encoding/decoding method according to an exemplary embodiment, a current block may be encoded/decoded in the direct prediction mode or the skip mode, based on results of performing prediction in a first direction, a second direction, and bi-directionally. To this end, the image encoding apparatus 900 of FIG. 9 encodes information regarding the prediction direction and inserts the result of encoding into a bitstream. The decoder 1410 decodes the information regarding the prediction direction inserted into the bitstream by using the image encoding apparatus 900.

The decoder 1410 may decode information indicating the motion vector of the current block from among a plurality of motion vector candidates, together with the information regarding the prediction direction. If as described above, the motion vector of the current block is implicitly determined based on a method of determining a motion vector, which is shared between an encoding side and a decoding side, then a total of one motion vector of the current block is determined according to the shared method and the information indicating the motion vector of the current block does not need to be decoded. However, when as described above, a plurality of motion vector candidates are produced based on motion vectors of a plurality of previously encoded blocks and the motion vector of the current block is determined from among the plurality of motion vector candidates, the information indicating the motion vector of the current block from among the plurality of motion vector candidates may be decoded.

Also, the decoder 1410 decodes information regarding pixel values of the current block. In this case, either information regarding a residual block of the current block or flag information indicating that the current block is the same as a predicted block is decoded. The decoder 1410 may restore the residual block by entropy-decoding, inversely quantizing, or inversely transforming the information regarding the residual block.

The motion vector determiner 1420 determines a motion vector of the current block so as to predict the current block in a predetermined direction, based on a result of the decoding of the information regarding the prediction direction by using the decoder 1410. If it is determined based on the result of the decoding that the prediction is performed in the first direction, a first-direction motion vector is determined as the motion vector of the current block. If it is determined based on the result of the decoding that the prediction is performed in the second direction, a second-direction motion vector is determined as the motion vector of the current block. If it is determined based on the result of decoding that the prediction is performed bi-directionally, the first-direction motion vector and the second-direction motion vector are determined as the motion vector of the current block.

When a motion vector of the current block is to be implicitly determined according to a method of determining a motion vector, which is shared between an encoding side and a decoding side, the motion vector of the current block is determined according to the shared method. This method has been described above with reference to FIGS. 11A and 11B.

However, when a motion vector of the current block is to be determined from among a plurality of motion vector candidates, the motion vector of the current block is determined, based on the information indicating the motion vector of the current block decoded by the decoder 1410 from among the plurality of motion vector candidates. The plurality of motion vector candidates are produced using a motion vector of at least one block that has been decoded before the decoding of the current block, and the motion vector of the current block is determined from among the plurality of motion vector candidates.

If the current block is predicted only in the first direction, a first-direction motion vector is determined from among the plurality of motion vector candidates, based on information indicating the first-direction motion vector decoded using the decoder 1410. If the current block is predicted only in the second direction, a second-direction motion vector is determined from among the plurality of motion vector candidates, based on information indicating the second-direction motion vector decoded using the decoder 1410. If the current block is predicted bi-directionally, the first-direction motion vector and the second-direction motion vector are determined from among the plurality of motion vector candidates, based on the information indicating the first-direction motion vector and the information indicating the second-direction motion vector decoded using the decoder 1410.

The restoring unit 1430 restores the current block based on the information regarding the pixel values decoded using the decoder 1410 and the motion vector of the current block determined using the motion vector determiner 1420.

A predicted block is produced by predicting the current block in the first direction, the second direction, or bi-directionally according to the motion vector determined using the motion vector determiner 1420. It a residual block is restored by decoding the information regarding the pixel values by using the decoder 1410, the restored residual block is combined with the predicted block so as to restore the current block. If the decoder 1410 decodes flag information indicating the predicted block is the same as the current block, the predicted block may be directly used as the restored current block.

A reference picture for predicting the current block may be inferred based on reference indexes of previously decoded blocks. As described above with reference to FIG. 11B, a reference index of the current block and a reference picture corresponding to the current block may be determined based on the reference indexes of the previously decoded blocks. Also, a reference picture corresponding to the motion vector determined by the motion vector determiner 1420 may be determined as the reference picture of the current block. For example, as described above with reference to FIG. 11A, if the motion vector mv_L0A is determined as a first-direction motion vector of the current block, the previous picture 1112 according to the motion vector mv_L0A may be automatically determined as the reference picture of the current block.

Figure 15:
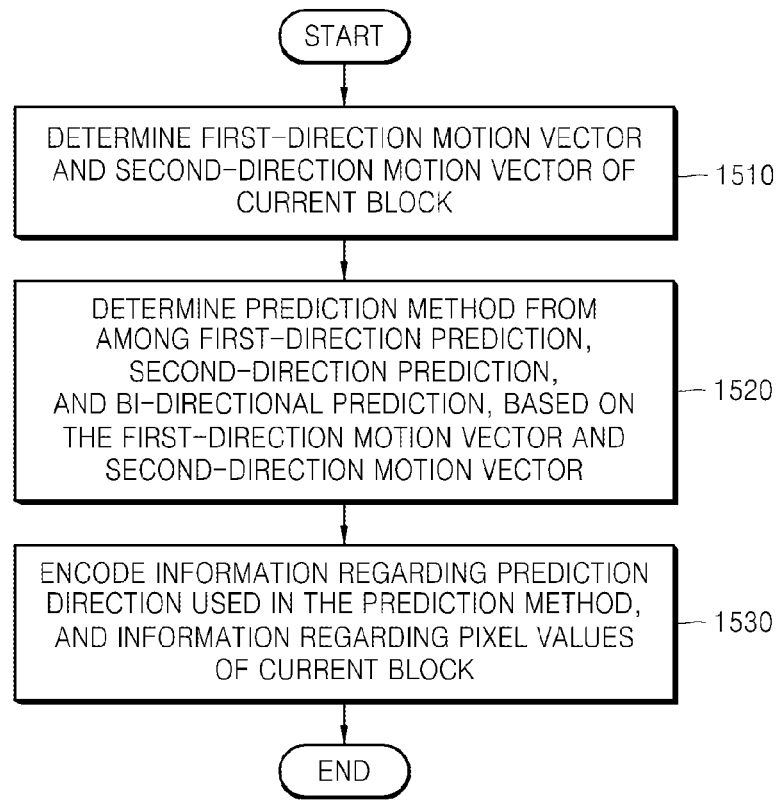
FIG. 15 is a flowchart illustrating an image encoding method according to an exemplary embodiment.

FIG. 15 is a flowchart illustrating an image encoding method according to an exemplary embodiment.

Referring to FIG. 15, in operation 1510, an image encoding apparatus determines a motion vector of a current block. For example, in operation 1510, a first-direction motion vector and a second-direction motion vector of a current block included in a current picture that is predicted bi-directionally are determined. The motion vector of the current block may be implicitly determined according to a method of determining a motion vector, which is shared between an encoding side and a decoding side, as described above with reference to FIGS. 11A and 11B. Otherwise, a plurality of motion vector candidates are produced, and the first-direction motion vector and the second-direction motion vector may be determined from among the plurality of motion vector candidates as described above with reference to FIGS. 12A, 12B, 13A, and 13B.

In operation 1520, the image encoding apparatus determines a prediction method so as to encode the current block from among first-direction prediction, second-direction prediction, and bi-directional prediction. The prediction method is determined to encode the current block from among first-direction prediction using the first-direction motion vector, second-direction prediction using the second-direction motion vector, and bi-directional prediction using both the first-direction motion vector and the second-direction motion vector.

A prediction method that most exactly predicts the current block from among first-direction prediction, second-direction prediction, and bi-directional prediction may be used to encode the current block. As described above, a prediction method in which the least SAD between a predicted block and the current block is obtained may be used to encode the current block.

In operation 1530, the image encoding apparatus encodes information regarding a prediction direction used in the prediction method determined in operation 1520. Binary numbers may be assigned to a first direction, a second direction, and bi-directions, respectively, and the binary number assigned to the prediction direction used to encode the current block may be encoded. The encoded binary number may be entropy-encoded according to a predetermined entropy encoding method. The information regarding the prediction direction may be encoded as a sequence parameter, a slice parameter, or a block parameter.

Information regarding pixel values of the current block is also encoded. In this case, information regarding residual values of residual blocks obtained by subtracting predicted blocks from the current block may be encoded. The residual blocks may be transformed, quantized, and entropy-encoded. Furthermore, as described above, only flag information indicating that a predicted block is the same as the current block may be encoded.

Information defining a motion vector used to encode the current block from among a plurality of motion vector candidates may also be encoded. If the plurality of motion vector candidates are produced based on a motion vector of at least one block encoded before encoding of the current block and one of the plurality of motion vector candidates is selected and used as the motion vector of the current block, then information indicating the selected motion vector may be encoded. If first-direction prediction is determined as the prediction method in operation 1520, then only information regarding the first-direction motion vector may be encoded. If second-direction prediction is determined as the prediction method in operation 1520, then only information regarding the second-direction motion vector may be encoded. If bi-direction prediction is determined as the prediction method in operation 1520, then only information regarding both the first-direction motion vector and the second-direction motion vector may be encoded.

Figure 16:
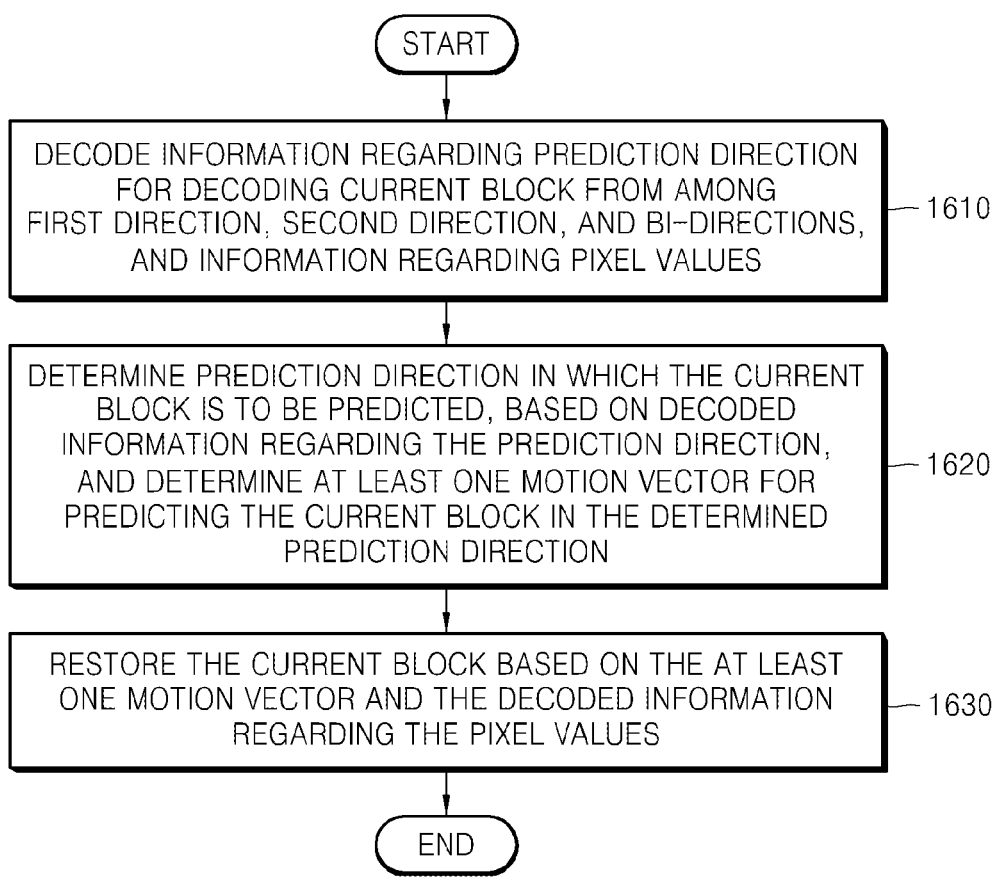
FIG. 16 is a flowchart illustrating an image decoding method according to an exemplary embodiment.

FIG. 16 is a flowchart illustrating an image decoding method according to an exemplary embodiment.

Referring to FIG. 16, in operation 1610, an image decoding apparatus decodes information regarding a prediction direction that is to be used to decode a current block from among a first direction, a second direction, and bi-directions. In this case, information regarding a prediction direction contained in a bitstream may be decoded. A binary number assigned to the prediction direction from among binary numbers assigned to the first direction, the second direction, and the bi-directions, respectively, may be decoded. The information regarding the prediction direction contained in the bitstream may be decoded as a sequence parameter, a slice parameter, or a block parameter.

In operation 1610, the image decoding apparatus also decodes information regarding pixel values of the current block. Information regarding residual values of residual blocks of the current block may be decoded. Information regarding the residual blocks may be entropy-decoded, inversely quantized, and inversely transformed to restore the residual blocks. Also, information indicating that the current block is the same as a predicted block may be decoded.

When the motion vector of the current block is determined from among a plurality of motion vector candidates as described above, information defining a motion vector to be used to decode the current block from among the plurality of motion vector candidates may be decoded. If a result of the decoding of the information regarding the prediction direction reveals that the prediction direction is the first direction, information indicating a first-direction motion vector of the current block from among the plurality of motion vector candidates may be decoded. If the result of the decoding of the information regarding the prediction direction reveals that the prediction direction is the second direction, information indicating a second-direction motion vector of the current block from among the plurality of motion vector candidates may be decoded. If the result of the decoding of the information regarding the prediction direction reveals that the prediction direction is the bi-directions, the information indicating the first-direction motion vector and the information indicating the second-direction motion vector from among the plurality of motion vector candidates may be decoded.

In operation 1620, the image decoding apparatus determines a prediction direction in which the current block is to be predicted, based on the information regarding the prediction direction decoded in operation 1610. The prediction direction in which the current block is to be predicted is determined based on a binary number corresponding to the prediction direction, the information of which was decoded in operation 1610. If the prediction direction in which the current block is to be predicted is determined, at least one motion vector for predicting the current block in the determined prediction direction is determined.

As described above, the motion vector of the current block may be implicitly determined according to a method of determining a motion vector, which is shared between an encoding side and a decoding side. If the motion vector of the current block is explicitly selected from among a plurality of motion vector candidates, then the plurality of motion vector candidates are produced based on at least one block motion vector decoded before decoding of the current block and the motion vector of the current block may be determined from among the plurality of motion vector candidates. The motion vector of the current block may be determined, based on the information indicating the motion vector of the current block from among the plurality of motion vector candidates, which was decoded in operation 1610. At least one from among a first-direction motion vector and a second-direction motion vector may be determined based on the information decoded in operation 1610.

In operation 1630, the image decoding apparatus restores the current block. A predicted block of the current block is determined based on the motion vector of the current block determined in operation 1620, and the current block is restored based on the predicted block.

The predicted block of the current block may be produced by performing one from among first-direction prediction, second-direction prediction, and bi-directional prediction, based on at least one of the first-direction motion vector and the second-direction motion vector determined in operation 1620.

If a residual block is restored in operation 1610, the predicted block is combined with the restored residual block so as to restore the current block. If the information indicating that the predicted block is the same as the current block is decoded, the predicted block is used as the current block.

While exemplary embodiments have been particularly shown and described above, it would be appreciated by those of ordinary skill in the art that changes may be made in these exemplary embodiments without departing from the principles and spirit of the inventive concept, the scope of which is defined in the claims and their equivalents. Also, a system according to an exemplary embodiment may be embodied as computer readable code in a computer readable recording medium.

For example, each of an image encoding apparatus, an image decoding apparatus, a motion vector encoding apparatus, and a motion vector decoding apparatus according to exemplary embodiments may include a bus coupled to the units of the apparatuses illustrated in FIGS. 1, 2, 4, 5, 9, and 14, and at least one processor connected to the bus. Each of the apparatuses may further include memory that is connected to the bus so as to store commands, received messages, or produced messages and is coupled to the at least one processor for performing the operations described above.

The computer readable recording medium may be any recording apparatus capable of storing data that is read by a computer system, e.g., a read-only memory (ROM), a random access memory (RAM), a compact disc (CD)-ROM, a magnetic tape, a floppy disk, an optical data storage device, and so on. The computer readable recording medium can be distributed among computer systems that are interconnected through a network, and the present invention may be stored and implemented as computer readable code in the distributed system.

The invention claimed is:

1. An image decoding method comprising:
   hierarchically splitting a maximum coding unit into at least one coding unit based on split information obtained from a bitstream;
   determining a current block in a coding unit among the at least one coding unit;
   obtaining information regarding a prediction direction to be used to decode the current block, the information indicating one of an L0 direction, an L1 direction, and a bi-direction;
   determining motion vector candidates of the current block based on a motion vector of at least one block decoded before decoding of the current block; and
   determining at least one motion vector of the current block based on at least one of a motion vector candidate in the L0 direction and a motion vector candidate in the L1 direction, from among the determined motion vector candidates, according to the information regarding a prediction direction,
   wherein the at least one block decoded before decoding of the current block comprises at least one of a first block located on a left side of a leftmost block from among lower blocks adjacent to a lower side of the current block and a second block located on an upper side of the first block,
   the image is split into a plurality of maximum coding units including the maximum coding unit,
   the maximum coding unit is hierarchically split into the at least one coding unit of depths,
   a coding unit of a current depth is one of square data unit split from a coding unit of an upper depth,
   when the split information indicates a split for the current depth, the coding unit of the current depth is split into four coding units of a lower depth, independently from neighboring coding units, and
   when the split information indicates a non-split for the current depth, a coding unit of the current depth is split into one or more prediction units, and the current block is a prediction unit.

* * * * *